(12) United States Patent
Gustavson et al.

(10) Patent No.: US 7,844,630 B2
(45) Date of Patent: Nov. 30, 2010

(54) METHOD AND STRUCTURE FOR FAST IN-PLACE TRANSFORMATION OF STANDARD FULL AND PACKED MATRIX DATA FORMATS

(75) Inventors: Fred Gehrung Gustavson, Briarcliff Manor, NY (US); John A. Gunnels, Yorktown Heights, NY (US); James C. Sexton, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 12/033,581

(22) Filed: Feb. 19, 2008

(65) Prior Publication Data

US 2009/0063529 A1 Mar. 5, 2009

Related U.S. Application Data

(63) Continuation-in-part of application No. 11/849,272, filed on Sep. 1, 2007.

(51) Int. Cl.
*G06F 17/00* (2006.01)

(52) U.S. Cl. .............. 707/791; 707/802; 707/822; 707/828

(58) Field of Classification Search .......... 707/600–831
See application file for complete search history.

(56) References Cited

U.S. PATENT DOCUMENTS 7,505,946 B2 * 3/2009 Chellapilla et al. ............ 706/11

* cited by examiner

*Primary Examiner*—Isaac M Woo
(74) *Attorney, Agent, or Firm*—McGinn IP Law Group, PLLC

(57) ABSTRACT

A computerized method provides for an in-place transformation of matrix A data including a New Data Structure (NDS) format and a transformation T having a compact representation. The NDS represents data of the matrix A in a format other than a row major format or a column major format, such that the data for the matrix A is stored as contiguous sub matrices of size MB by NB in an order predetermined to provide the data for a matrix processing. The transformation T is applied to the MB by NB blocks, using an in-place transformation processing, thereby replacing data of the block A1 with the contents of T(A1).

19 Claims, 16 Drawing Sheets

Generalized Standard Format
A is M by N and resides in array A(0:LDAR * KDAC-1)

Rectangular Block Format
A is M by N and resides in array A(0:M1*N1-1) in RB format

700

| i/j*LDA | 0 | 10 | 20 | 30 | 40 |
|---|---|---|---|---|---|
| 0 | $a_{00}$ | | | | $a_{04}$ |
| 1 | | | | | |
| 2 | | | | | |
| 3 | | 13 | 23 | | |
| 4 | | 14 | 24 | | |
| 5 | | 15 | 25 | | |
| 6 | | | | | |
| 7 | | | | | |
| 8 | | | | | |
| 9 | $a_{90}$ | | | | $a_{94}$ |

| i/j* LDA | 0 | 5 | 10 | 15 | 20 | 25 | 30 | 35 | 40 | 45 |
|---|---|---|---|---|---|---|---|---|---|---|
| 0 | $b_{00}$ | | | | | | | | | $b_{09}$ |
| 1 | | | | 16 | 21 | 26 | | | | |
| 2 | | | | 17 | 22 | 27 | | | | |
| 3 | | | | | | | | | | |
| 4 | $b_{40}$ | | | | | | | | | $b_{49}$ |

|    | 0  | 16 | 32 | 48 | 64 | 80  | 96  | 112 | 128 | 144 | 160 | 176 | 192 | 208 | 224 | 240 | 256 | 272 |
|----|----|----|----|----|----|-----|-----|-----|-----|-----|-----|-----|-----|-----|-----|-----|-----|-----|
| 0  | 0  | 16 | 32 | 48 | 64 | 80  | 96  | 112 | 128 | 144 | 160 | 176 | 192 | 208 | 224 | 240 | 256 | 272 |
| 1  | 1  | 17 | 33 | 49 | 65 | 81  | 97  | 113 | 129 | 145 | 161 | 177 | 193 | 209 | 225 | 241 | 257 | 273 |
| 2  | 2  | 18 | 34 | 50 | 66 | 82  | 98  | 114 | 130 | 146 | 162 | 178 | 194 | 210 | 226 | 242 | 258 | 274 |
| 3  | 3  | 19 | 35 | 51 | 67 | 83  | 99  | 115 | 131 | 147 | 163 | 179 | 195 | 211 | 227 | 243 | 259 | 275 |
| 4  | 4  | 20 | 36 | 52 | 68 | 84  | 100 | 116 | 132 | 148 | 164 | 180 | 196 | 212 | 228 | 244 | 260 | 276 |
| 5  | 5  | 21 | 37 | 53 | 69 | 85  | 101 | 117 | 133 | 149 | 165 | 181 | 197 | 213 | 229 | 245 | 261 | 277 |
| 6  | 6  | 22 | 38 | 54 | 70 | 86  | 102 | 118 | 134 | 150 | 166 | 182 | 198 | 214 | 230 | 246 | 262 | 278 |
| 7  | 7  | 23 | 39 | 55 | 71 | 87  | 103 | 119 | 135 | 151 | 167 | 183 | 199 | 215 | 231 | 247 | 263 | 279 |
| 8  | 8  | 24 | 40 | 56 | 72 | 88  | 104 | 120 | 136 | 152 | 168 | 184 | 200 | 216 | 232 | 248 | 264 | 280 |
| 9  | 9  | 25 | 41 | 57 | 73 | 89  | 105 | 121 | 137 | 153 | 169 | 185 | 201 | 217 | 233 | 249 | 265 | 281 |
| 10 | 10 | 26 | 42 | 58 | 74 | 90  | 106 | 122 | 138 | 154 | 170 | 186 | 202 | 218 | 234 | 250 | 266 | 282 |
| 11 | 11 | 27 | 43 | 59 | 75 | 91  | 107 | 123 | 139 | 155 | 171 | 187 | 203 | 219 | 235 | 251 | 267 | 283 |
| 12 | 12 | 28 | 44 | 60 | 76 | 92  | 108 | 124 | 140 | 156 | 172 | 188 | 204 | 220 | 236 | 252 | 268 | 284 |
| 13 | 13 | 29 | 45 | 61 | 77 | 93  | 109 | 125 | 141 | 157 | 173 | 189 | 205 | 221 | 237 | 253 | 269 | 285 |
| 14 | 14 | 30 | 46 | 62 | 78 | 94  | 110 | 126 | 142 | 158 | 174 | 190 | 206 | 222 | 238 | 254 | 270 | 286 |
| 15 | 15 | 31 | 47 | 63 | 79 | 95  | 111 | 127 | 143 | 159 | 175 | 191 | 207 | 223 | 239 | 255 | 271 | 287 |

$A =$ (rows 0–15 above)

reg block(i,j) = 0 0   starts at loc = 0

901

| 0 | 0 | 4 | 8 | 12 | 16 | 20 | 24 | 28 | 32 | 36 | 40 | 44 | 48 | 52 | 56 | 60 | 64 | 68 |
|---|---|---|---|----|----|----|----|----|----|----|----|----|----|----|----|----|----|----|
| 0 | 0 | 16 | 32 | 48 | 64 | 80 | 96 | 112 | 128 | 144 | 160 | 176 | 192 | 208 | 224 | 240 | 256 | 272 |
| 1 | 1 | 17 | 33 | 49 | 65 | 81 | 97 | 113 | 129 | 145 | 161 | 177 | 193 | 209 | 225 | 241 | 257 | 273 |
| 2 | 2 | 18 | 34 | 50 | 66 | 82 | 98 | 114 | 130 | 146 | 162 | 178 | 194 | 210 | 226 | 242 | 258 | 274 |
| 3 | 3 | 19 | 35 | 51 | 67 | 83 | 99 | 115 | 131 | 147 | 163 | 179 | 195 | 211 | 227 | 243 | 259 | 275 | reg block(i,j) = 1 0   starts at loc = 72: D consists of 4 ReB's at

| 72 | 0 | 4 | 8 | 12 | 16 | 20 | 24 | 28 | 32 | 36 | 40 | 44 | 48 | 52 | 56 | 60 | 64 | 68 |
|----|---|---|---|----|----|----|----|----|----|----|----|----|----|----|----|----|----|----|
| 0  | 4 | 20 | 36 | 52 | 68 | 84 | 100 | 116 | 132 | 148 | 164 | 180 | 196 | 212 | 228 | 244 | 260 | 276 |
| 1  | 5 | 21 | 37 | 53 | 69 | 85 | 101 | 117 | 133 | 149 | 165 | 181 | 197 | 213 | 229 | 245 | 261 | 277 |
| 2  | 6 | 22 | 38 | 54 | 70 | 86 | 102 | 118 | 134 | 150 | 166 | 182 | 198 | 214 | 230 | 246 | 262 | 278 |
| 3  | 7 | 23 | 39 | 55 | 71 | 87 | 103 | 119 | 135 | 151 | 167 | 183 | 199 | 215 | 231 | 247 | 263 | 279 | reg block(i,j) = 2 0   starts at loc = 144: locations 0, 72, 144, 216

| 144 | 0 | 4 | 8 | 12 | 16 | 20 | 24 | 28 | 32 | 36 | 40 | 44 | 48 | 52 | 56 | 60 | 64 | 68 |
|-----|---|---|---|----|----|----|----|----|----|----|----|----|----|----|----|----|----|----|
| 0   | 8 | 24 | 40 | 56 | 72 | 88 | 104 | 120 | 136 | 152 | 168 | 184 | 200 | 216 | 232 | 248 | 264 | 280 |
| 1   | 9 | 25 | 41 | 57 | 73 | 89 | 105 | 121 | 137 | 153 | 169 | 185 | 201 | 217 | 233 | 249 | 265 | 281 |
| 2   | 10 | 26 | 42 | 58 | 74 | 90 | 106 | 122 | 138 | 154 | 170 | 186 | 202 | 218 | 234 | 250 | 266 | 282 |
| 3   | 11 | 27 | 43 | 59 | 75 | 91 | 107 | 123 | 139 | 155 | 171 | 187 | 203 | 219 | 235 | 251 | 267 | 283 | reg block(i,j) = 3 0   starts at loc = 216

| 216 | 0 | 4 | 8 | 12 | 16 | 20 | 24 | 28 | 32 | 36 | 40 | 44 | 48 | 52 | 56 | 60 | 64 | 68 |
|-----|---|---|---|----|----|----|----|----|----|----|----|----|----|----|----|----|----|----|
| 0   | 12 | 28 | 44 | 60 | 76 | 92 | 108 | 124 | 140 | 156 | 172 | 188 | 204 | 220 | 236 | 252 | 268 | 284 |
| 1   | 13 | 29 | 45 | 61 | 77 | 93 | 109 | 125 | 141 | 157 | 173 | 189 | 205 | 221 | 237 | 253 | 269 | 285 |
| 2   | 14 | 30 | 46 | 62 | 78 | 94 | 110 | 126 | 142 | 158 | 174 | 190 | 206 | 222 | 238 | 254 | 270 | 286 |
| 3   | 15 | 31 | 47 | 63 | 79 | 95 | 111 | 127 | 143 | 159 | 175 | 191 | 207 | 223 | 239 | 255 | 271 | 287 |

VM D1 is ml by kl matrix of mb by kb ReBs: ml=4, kl=6, mb=4, kb=3
```

1000

|    | 0  | 4  | 8\|  | 48 | 52 | 56\| | 96  | 100 | 104\| | 144 | 148 | 152\| | 192 | 196 | 200\| | 240 | 244 | 248  |
|----|----|----|------|----|----|------|-----|-----|-------|-----|-----|-------|-----|-----|-------|-----|-----|------|
| 0  | 0  | 16 | 32\| | 48 | 64 | 80\| | 96  | 112 | 128\| | 144 | 160 | 176\| | 192 | 208 | 224\| | 240 | 256 | 272\||
| 1  | 1  | 17 | 33\| | 49 | 65 | 81\| | 97  | 113 | 129\| | 145 | 161 | 177\| | 193 | 209 | 225\| | 241 | 257 | 273\||
| 2  | 2  | 18 | 34\| | 50 | 66 | 82\| | 98  | 114 | 130\| | 146 | 162 | 178\| | 194 | 210 | 226\| | 242 | 258 | 274\||
| 3  | 3  | 19 | 35\| | 51 | 67 | 83\| | 99  | 115 | 131\| | 147 | 163 | 179\| | 195 | 211 | 227\| | 243 | 259 | 275\||
| 12 | 4  | 20 | 36\| | 52 | 68 | 84\| | 100 | 116 | 132\| | 148 | 164 | 180\| | 196 | 212 | 228\| | 244 | 260 | 276\||
| 13 | 5  | 21 | 37\| | 53 | 69 | 85\| | 101 | 117 | 133\| | 149 | 165 | 181\| | 197 | 213 | 229\| | 245 | 261 | 277\||
| 14 | 6  | 22 | 38\| | 54 | 70 | 86\| | 102 | 118 | 134\| | 150 | 166 | 182\| | 198 | 214 | 230\| | 246 | 262 | 278\||
| 15 | 7  | 23 | 39\| | 55 | 71 | 87\| | 103 | 119 | 135\| | 151 | 167 | 183\| | 199 | 215 | 231\| | 247 | 263 | 279\||
| 24 | 8  | 24 | 40\| | 56 | 72 | 88\| | 104 | 120 | 136\| | 152 | 168 | 184\| | 200 | 216 | 232\| | 248 | 264 | 280\||
| 25 | 9  | 25 | 41\| | 57 | 73 | 89\| | 105 | 121 | 137\| | 153 | 169 | 185\| | 201 | 217 | 233\| | 249 | 265 | 281\||
| 26 | 10 | 26 | 42\| | 58 | 74 | 90\| | 106 | 122 | 138\| | 154 | 170 | 186\| | 202 | 218 | 234\| | 250 | 266 | 282\||
| 27 | 11 | 27 | 43\| | 59 | 75 | 91\| | 107 | 123 | 139\| | 155 | 171 | 187\| | 203 | 219 | 235\| | 251 | 267 | 283\||
| 36 | 12 | 28 | 44\| | 60 | 76 | 92\| | 108 | 124 | 140\| | 156 | 172 | 188\| | 204 | 220 | 236\| | 252 | 268 | 284\||
| 37 | 13 | 29 | 45\| | 61 | 77 | 93\| | 109 | 125 | 141\| | 157 | 173 | 189\| | 205 | 221 | 237\| | 253 | 269 | 285\||
| 38 | 14 | 30 | 46\| | 62 | 78 | 94\| | 110 | 126 | 142\| | 158 | 174 | 190\| | 206 | 222 | 238\| | 254 | 270 | 286\||
| 39 | 15 | 31 | 47\| | 63 | 79 | 95\| | 111 | 127 | 143\| | 159 | 175 | 191\| | 207 | 223 | 239\| | 255 | 271 | 287\||

|      | 0  | 18 | 36 | 54 | 72\| | 90  | 108 | 126 | 144 | 162\| | 180 | 198 | 216 | 234 | 252\| | 270 | 288 | 306 | 324 | 342 |
|------|----|----|----|----|------|-----|-----|-----|-----|-------|-----|-----|-----|-----|-------|-----|-----|-----|-----|-----|
| 0    | 0  | 18 | 36 | 54 | 72\| | 90  | 108 | 126 | 144 | 162\| | 180 | 198 | 216 | 234 | 252\| | 270 | 288 | 306 | 324 | 342 |
| 1    | 1  | 19 | 37 | 55 | 73\| | 91  | 109 | 127 | 145 | 163\| | 181 | 199 | 217 | 235 | 253\| | 271 | 289 | 307 | 325 | 343 |
| 2    | 2  | 20 | 38 | 56 | 74\| | 92  | 110 | 128 | 146 | 164\| | 182 | 200 | 218 | 236 | 254\| | 272 | 290 | 308 | 326 | 344 |
| 3    | 3  | 21 | 39 | 57 | 75\| | 93  | 111 | 129 | 147 | 165\| | 183 | 201 | 219 | 237 | 255\| | 273 | 291 | 309 | 327 | 345 |
| 4    | 4  | 22 | 40 | 58 | 76\| | 94  | 112 | 130 | 148 | 166\| | 184 | 202 | 220 | 238 | 256\| | 274 | 292 | 310 | 328 | 346 |
| 5    | 5  | 23 | 41 | 59 | 77\| | 95  | 113 | 131 | 149 | 167\| | 185 | 203 | 221 | 239 | 257\| | 275 | 293 | 311 | 329 | 347 |
| 6    | 6  | 24 | 42 | 60 | 78\| | 96  | 114 | 132 | 150 | 168\| | 186 | 204 | 222 | 240 | 258\| | 276 | 294 | 312 | 330 | 348 |
| 7    | 7  | 25 | 43 | 61 | 79\| | 97  | 115 | 133 | 151 | 169\| | 187 | 205 | 223 | 241 | 259\| | 277 | 295 | 313 | 331 | 349 |
| B=8  | 8  | 26 | 44 | 62 | 80\| | 98  | 116 | 134 | 152 | 170\| | 188 | 206 | 224 | 242 | 260\| | 278 | 296 | 314 | 332 | 350 |
| 9    | 9  | 27 | 45 | 63 | 81\| | 99  | 117 | 135 | 153 | 171\| | 189 | 207 | 225 | 243 | 261\| | 279 | 297 | 315 | 333 | 351 |
| 10   | 10 | 28 | 46 | 64 | 82\| | 100 | 118 | 136 | 154 | 172\| | 190 | 208 | 226 | 244 | 262\| | 280 | 298 | 316 | 334 | 352 |
| 11   | 11 | 29 | 47 | 65 | 83\| | 101 | 119 | 137 | 155 | 173\| | 191 | 209 | 227 | 245 | 263\| | 281 | 299 | 317 | 335 | 353 |
| 12   | 12 | 30 | 48 | 66 | 84\| | 102 | 120 | 138 | 156 | 174\| | 192 | 210 | 228 | 246 | 264\| | 282 | 300 | 318 | 336 | 354 |
| 13   | 13 | 31 | 49 | 67 | 85\| | 103 | 121 | 139 | 157 | 175\| | 193 | 211 | 229 | 247 | 265\| | 283 | 301 | 319 | 337 | 355 |
| 14   | 14 | 32 | 50 | 68 | 86\| | 104 | 122 | 140 | 158 | 176\| | 194 | 212 | 230 | 248 | 266\| | 284 | 302 | 320 | 338 | 356 |
| 15   | 15 | 33 | 51 | 69 | 87\| | 105 | 123 | 141 | 159 | 177\| | 195 | 213 | 231 | 249 | 267\| | 285 | 303 | 321 | 339 | 357 |
| 16   | 16 | 34 | 52 | 70 | 88\| | 106 | 124 | 142 | 160 | 178\| | 196 | 214 | 232 | 250 | 268\| | 286 | 304 | 322 | 340 | 358 |
| 17   | 17 | 35 | 53 | 71 | 89\| | 107 | 125 | 143 | 161 | 179\| | 197 | 215 | 233 | 251 | 269\| | 287 | 305 | 323 | 341 | 359 |

FIG. 11

B consists of four column swaths BS of size 18 by 5          1200
ReB format of B consists of these four column swaths transposed 1st BS=E is m by n(m,n,lda)= 18 5 18 :

|    | 0  | 18 | 36 | 54 | 72 |
|----|----|----|----|----|----|
| 0  | 0  | 18 | 36 | 54 | 72 |
| 1  | 1  | 19 | 37 | 55 | 73 |
| 2  | 2  | 20 | 38 | 56 | 74 |
| 3  | 3  | 21 | 39 | 57 | 75 |
| 4  | 4  | 22 | 40 | 58 | 76 |
| 5  | 5  | 23 | 41 | 59 | 77 |
| 6  | 6  | 24 | 42 | 60 | 78 |
| 7  | 7  | 25 | 43 | 61 | 79 |
| 8  | 8  | 26 | 44 | 62 | 80 |
| 9  | 9  | 27 | 45 | 63 | 81 |
| 10 | 10 | 28 | 46 | 64 | 82 |
| 11 | 11 | 29 | 47 | 65 | 83 |
| 12 | 12 | 30 | 48 | 66 | 84 |
| 13 | 13 | 31 | 49 | 67 | 85 |
| 14 | 14 | 32 | 50 | 68 | 86 |
| 15 | 15 | 33 | 51 | 69 | 87 |
| 16 | 16 | 34 | 52 | 70 | 88 |
| 17 | 17 | 35 | 53 | 71 | 89 |

1201

1st BS^T=E^T is n by m(n,m,lda)= 5 18 5 is the 1st ReB :

|    |    |    |    |    |    |
|----|----|----|----|----|----|
| 0  | 0  | 18 | 36 | 54 | 72 |
| 5  | 1  | 19 | 37 | 55 | 73 |
| 10 | 2  | 20 | 38 | 56 | 74 |
| 15 | 3  | 21 | 39 | 57 | 75 |
| 20 | 4  | 22 | 40 | 58 | 76 |
| 25 | 5  | 23 | 41 | 59 | 77 |
| 30 | 6  | 24 | 42 | 60 | 78 |
| 35 | 7  | 25 | 43 | 61 | 79 |
| 40 | 8  | 26 | 44 | 62 | 80 |
| 45 | 9  | 27 | 45 | 63 | 81 |
| 50 | 10 | 28 | 46 | 64 | 82 |
| 55 | 11 | 29 | 47 | 65 | 83 |
| 60 | 12 | 30 | 48 | 66 | 84 |
| 65 | 13 | 31 | 49 | 67 | 85 |
| 70 | 14 | 32 | 50 | 68 | 86 |
| 75 | 15 | 33 | 51 | 69 | 87 |
| 80 | 16 | 34 | 52 | 70 | 88 |
| 85 | 17 | 35 | 53 | 71 | 89 |

FIG. 12

```
ReB is kb by nb = 3 5   starts as loc = 0
 0 |   0    3    6    9   12                           1300
   +----------------------
 0 |   0   18   36   54   72
 1 |   1   19   37   55   73
 2 |   2   20   38   56   74
ReB is kb by nb = 3 5   starts as loc = 15
15 |   0    3    6    9   12
   +----------------------
 0 |   3   21   39   57   75
 1 |   4   22   40   58   76
 2 |   5   23   41   59   77
ReB is kb by nb = 3 5   starts as loc = 30
30 |   0    3    6    9   12
   +----------------------
 0 |   6   24   42   60   78
 1 |   7   25   43   61   79
 2 |   8   26   44   62   80
ReB is kb by nb = 3 5   starts as loc = 45
45 |   0    3    6    9   12
   +----------------------
 0 |   9   27   45   63   81
 1 |  10   28   46   64   82
 2 |  11   29   47   65   83
ReB is kb by nb = 3 5   starts as loc = 60
60 |   0    3    6    9   12
   +----------------------
 0 |  12   30   48   66   84
 1 |  13   31   49   67   85
 2 |  14   32   50   68   86
ReB is kb by nb = 3 5   starts as loc = 75
75 |   0    3    6    9   12
   +----------------------
 0 |  15   33   51   69   87
 1 |  16   34   52   70   88
 2 |  17   35   53   71   89

BS^T=E^T is K=18 by nb=5. BS^T=E^T is formed
transposing each of the above k=six ReB's: 1301
   |   0    1    2    3    4
   +----------------------
 0 |   0   18   36   54   72
 5 |   1   19   37   55   73
10 |   2   20   38   56   74
15 |   3   21   39   57   75
20 |   4   22   40   58   76
25 |   5   23   41   59   77
30 |   6   24   42   60   78
35 |   7   25   43   61   79
40 |   8   26   44   62   80
45 |   9   27   45   63   81
50 |  10   28   46   64   82
55 |  11   29   47   65   83
60 |  12   30   48   66   84
65 |  13   31   49   67   85
70 |  14   32   50   68   86
75 |  15   33   51   69   87
80 |  16   34   52   70   88
85 |  17   35   53   71   89
```

FIG. 13

```
C is M by K: M=m*mb, N=n*nb 16 4 4 20 4 5                                                    1400
C is m by n(m,n,lda) = 16 20 16
   |  0  16  32  48  64   80   96  112  128  144  160  176  192  208  224  240  256  272  288  304
---+-----------------------------------------------------------------------------------------------
 0 |  0  16  32  48  64   80   96  112  128  144  160  176  192  208  224  240  256  272  288  304
 1 |  1  17  33  49  65   81   97  113  129  145  161  177  193  209  225  241  257  273  289  305
 2 |  2  18  34  50  66   82   98  114  130  146  162  178  194  210  226  242  258  274  290  306
 3 |  3  19  35  51  67   83   99  115  131  147  163  179  195  211  227  243  259  275  291  307
 4 |  4  20  36  52  68   84  100  116  132  148  164  180  196  212  228  244  260  276  292  308
 5 |  5  21  37  53  69   85  101  117  133  149  165  181  197  213  229  245  261  277  293  309
 6 |  6  22  38  54  70   86  102  118  134  150  166  182  198  214  230  246  262  278  294  310
 7 |  7  23  39  55  71   87  103  119  135  151  167  183  199  215  231  247  263  279  295  311
 8 |  8  24  40  56  72   88  104  120  136  152  168  184  200  216  232  248  264  280  296  312
 9 |  9  25  41  57  73   89  105  121  137  153  169  185  201  217  233  249  265  281  297  313
10 | 10  26  42  58  74   90  106  122  138  154  170  186  202  218  234  250  266  282  298  314
11 | 11  27  43  59  75   91  107  123  139  155  171  187  203  219  235  251  267  283  299  315
12 | 12  28  44  60  76   92  108  124  140  156  172  188  204  220  236  252  268  284  300  316
13 | 13  29  45  61  77   93  109  125  141  157  173  189  205  221  237  253  269  285  301  317
14 | 14  30  46  62  78   94  110  126  142  158  174  190  206  222  238  254  270  286  302  318
15 | 15  31  47  63  79   95  111  127  143  159  175  191  207  223  239  255  271  287  303  319

1401
F = CReB is ml=4, mb=4 by N=18 row swaths at locs 0, 80, 160, 240

ReB j = 0  starts at loc = 0
 0 |  0   4   8  12  16   20   24   28   32   36   40   44   48   52   56   60   64   68   72   76
---+-----------------------------------------------------------------------------------------------
 0 |  0  16  32  48  64   80   96  112  128  144  160  176  192  208  224  240  256  272  288  304
 1 |  1  17  33  49  65   81   97  113  129  145  161  177  193  209  225  241  257  273  289  305
 2 |  2  18  34  50  66   82   98  114  130  146  162  178  194  210  226  242  258  274  290  306
 3 |  3  19  35  51  67   83   99  115  131  147  163  179  195  211  227  243  259  275  291  307
ReB j = 1  starts at loc = 80
80 |  0   4   8  12  16   20   24   28   32   36   40   44   48   52   56   60   64   68   72   76
---+-----------------------------------------------------------------------------------------------
 0 |  4  20  36  52  68   84  100  116  132  148  164  180  196  212  228  244  260  276  292  308
 1 |  5  21  37  53  69   85  101  117  133  149  165  181  197  213  229  245  261  277  293  309
 2 |  6  22  38  54  70   86  102  118  134  150  166  182  198  214  230  246  262  278  294  310
 3 |  7  23  39  55  71   87  103  119  135  151  167  183  199  215  231  247  263  279  295  311
ReB j = 2  starts at loc = 160
160|  0   4   8  12  16   20   24   28   32   36   40   44   48   52   56   60   64   68   72   76
---+-----------------------------------------------------------------------------------------------
 0 |  8  24  40  56  72   88  104  120  136  152  168  184  200  216  232  248  264  280  296  312
 1 |  9  25  41  57  73   89  105  121  137  153  169  185  201  217  233  249  265  281  297  313
 2 | 10  26  42  58  74   90  106  122  138  154  170  186  202  218  234  250  266  282  298  314
 3 | 11  27  43  59  75   91  107  123  139  155  171  187  203  219  235  251  267  283  299  315
ReB j = 3  starts at loc = 240
240|  0   4   8  12  16   20   24   28   32   36   40   44   48   52   56   60   64   68   72   76
---+-----------------------------------------------------------------------------------------------
 0 | 12  28  44  60  76   92  108  124  140  156  172  188  204  220  236  252  268  284  300  316
 1 | 13  29  45  61  77   93  109  125  141  157  173  189  205  221  237  253  269  285  301  317
 2 | 14  30  46  62  78   94  110  126  142  158  174  190  206  222  238  254  270  286  302  318
 3 | 15  31  47  63  79   95  111  127  143  159  175  191  207  223  239  255  271  287  303  319
```

VM F1 is ml by nl mb by nb ReBs= 4  4  4  5

|    | 0  | 4  | 8  | 12 | 16 | 80 | 84 | 88 | 92 | 96 | 160 | 164 | 168 | 172 | 176 | 240 | 244 | 248 | 252 | 256 |
|----|----|----|----|----|----|----|----|----|----|----|-----|-----|-----|-----|-----|-----|-----|-----|-----|-----|
| 0  | 0  | 16 | 32 | 48 | 64 | 80 | 96 | 112| 128| 144| 160 | 176 | 192 | 208 | 224 | 240 | 256 | 272 | 288 | 304 |
| 1  | 1  | 17 | 33 | 49 | 65 | 81 | 97 | 113| 129| 145| 161 | 177 | 193 | 209 | 225 | 241 | 257 | 273 | 289 | 305 |
| 2  | 2  | 18 | 34 | 50 | 66 | 82 | 98 | 114| 130| 146| 162 | 178 | 194 | 210 | 226 | 242 | 258 | 274 | 290 | 306 |
| 3  | 3  | 19 | 35 | 51 | 67 | 83 | 99 | 115| 131| 147| 163 | 179 | 195 | 211 | 227 | 243 | 259 | 275 | 291 | 307 |
| 20 | 4  | 20 | 36 | 52 | 68 | 84 | 100| 116| 132| 148| 164 | 180 | 196 | 212 | 228 | 244 | 260 | 276 | 292 | 308 |
| 21 | 5  | 21 | 37 | 53 | 69 | 85 | 101| 117| 133| 149| 165 | 181 | 197 | 213 | 229 | 245 | 261 | 277 | 293 | 309 |
| 22 | 6  | 22 | 38 | 54 | 70 | 86 | 102| 118| 134| 150| 166 | 182 | 198 | 214 | 230 | 246 | 262 | 278 | 294 | 310 |
| 23 | 7  | 23 | 39 | 55 | 71 | 87 | 103| 119| 135| 151| 167 | 183 | 199 | 215 | 231 | 247 | 263 | 279 | 295 | 311 |
| 40 | 8  | 24 | 40 | 56 | 72 | 88 | 104| 120| 136| 152| 168 | 184 | 200 | 216 | 232 | 248 | 264 | 280 | 296 | 312 |
| 41 | 9  | 25 | 41 | 57 | 73 | 89 | 105| 121| 137| 153| 169 | 185 | 201 | 217 | 233 | 249 | 265 | 281 | 297 | 313 |
| 42 | 10 | 26 | 42 | 58 | 74 | 90 | 106| 122| 138| 154| 170 | 186 | 202 | 218 | 234 | 250 | 266 | 282 | 298 | 314 |
| 43 | 11 | 27 | 43 | 59 | 75 | 91 | 107| 123| 139| 155| 171 | 187 | 203 | 219 | 235 | 251 | 267 | 283 | 299 | 315 |
| 60 | 12 | 28 | 44 | 60 | 76 | 92 | 108| 124| 140| 156| 172 | 188 | 204 | 220 | 236 | 252 | 268 | 284 | 300 | 316 |
| 61 | 13 | 29 | 45 | 61 | 77 | 93 | 109| 125| 141| 157| 173 | 189 | 205 | 221 | 237 | 253 | 269 | 285 | 301 | 317 |
| 62 | 14 | 30 | 46 | 62 | 78 | 94 | 110| 126| 142| 158| 174 | 190 | 206 | 222 | 238 | 254 | 270 | 286 | 302 | 318 |
| 63 | 15 | 31 | 47 | 63 | 79 | 95 | 111| 127| 143| 159| 175 | 191 | 207 | 223 | 239 | 255 | 271 | 287 | 303 | 319 |

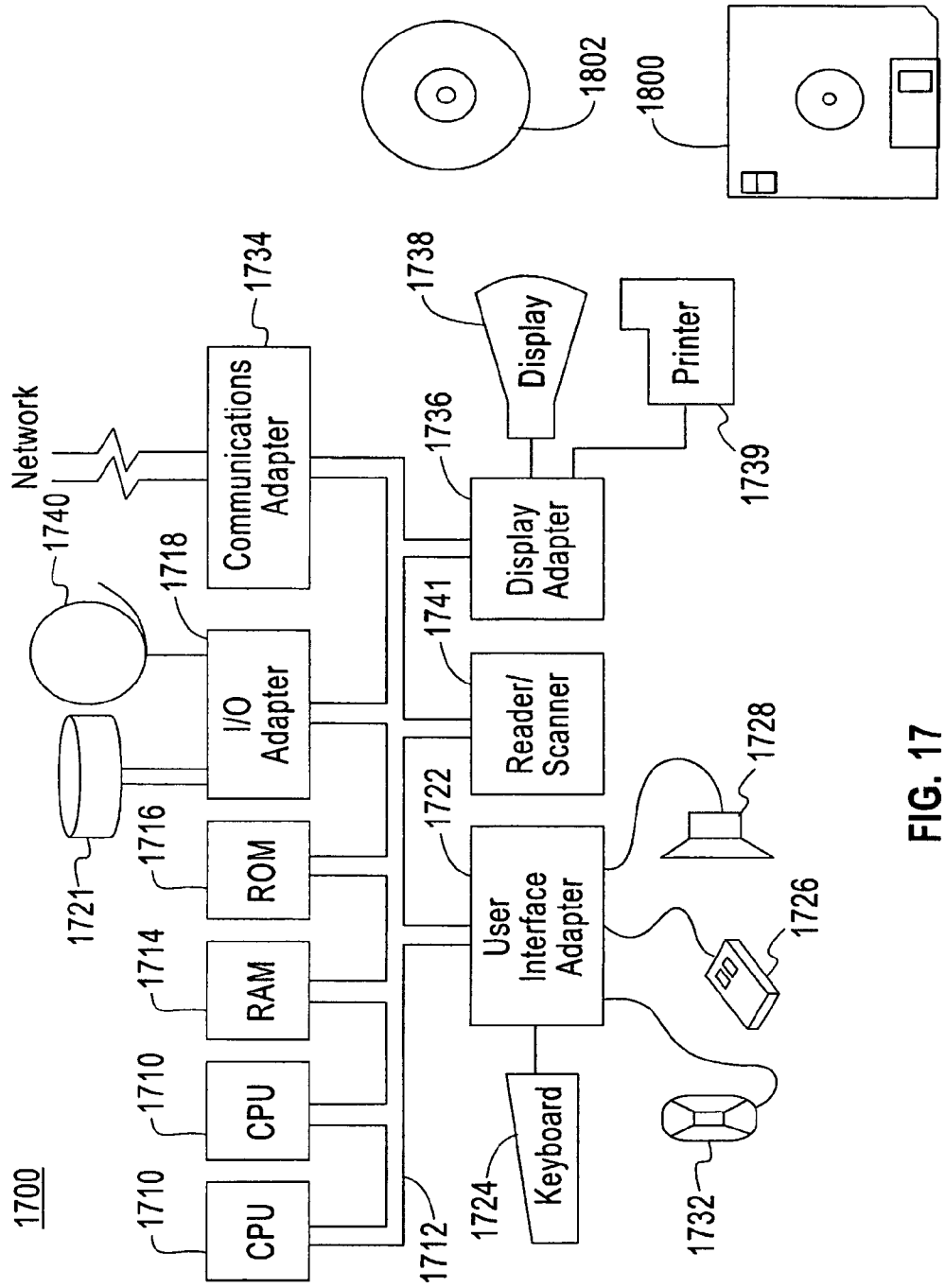

METHOD AND STRUCTURE FOR FAST IN-PLACE TRANSFORMATION OF STANDARD FULL AND PACKED MATRIX DATA FORMATS

CROSS-REFERENCE TO RELATED APPLICATIONS

The present application is a continuation-in-part of U.S. patent application Ser. No. 11/849,272, filed on Sep. 1, 2007, to Gustavson et al., also entitled "METHOD AND STRUCTURE FOR FAST IN-PLACE TRANSFORMATION OF STANDARD FULL AND PACKED MATRIX DATA FORMATS".

The present application, therefore, is also related to:

U.S. patent application Ser. No. 11/035,933, filed on Jan. 14, 2005, to Gustavson et al., entitled "METHOD AND STRUCTURE FOR CACHE AWARE TRANSPOSITIONS VIA RECTANGULAR SUBSECTIONS"; and U.S. patent application Ser. No. 11/045,354, filed on Jan. 31, 2005, to Gustavson et al., entitled "METHOD AND STRUCTURE FOR A HYBRID FULL-PACKED STORAGE FORMAT AS A SINGLE RECTANGULAR FORMAT DATA STRUCTURE".

All of the above applications are assigned to the present assignee, and incorporated herein by reference.

BACKGROUND OF THE INVENTION

1. Field of the Invention

The present invention generally relates to improving efficiency of in-place data transformations such as a matrix transposition. More specifically, part of the data to be transformed is pre-arranged, if necessary, to first be contiguously arranged in memory as contiguous blocks of contiguous data, which data is then available to be retrieved from memory into cache in units of the blocks of contiguous data, for application of a transformation on the data such as a matrix transposition, and then replaced in the same memory space. The part of the data which cannot be transformed because of space limitations is saved in a buffer and later placed out-of- place back into holes of the transformed data. This continuation-in-part application extends the concept of in-place transformation, such as a matrix transposition, to a small portion of matrix data treated as a unit.

2. Description of the Related Art

Standard format for matrix data in Fortran is column major order and for C is row major order. Thus, in matrix multiplication, where there are three matrices, at least one matrix will have data stored in memory in a manner in which an entire data line must be retrieved in order to get only one data element of interest.

The present inventors have developed a number of methods to improve efficiency in matrix processing to overcome this inherent problem with standard format consisting of either row major or column major, including several new data structures that allow matrix data to be stored in memory in non standard formats, so that the data will be retrieved as needed for processing as contiguous data appropriately arranged in a line of memory, including variations based upon computer architectural features and deficiencies. These new data structures, therefore, greatly improve efficiency in Dense Linear Algebra Factorization Algorithm (DLAFA) processing.

For example, the first of the above-identified applications provides an efficient method to perform an in-place transformation of matrix data as might be used, for example, for an in-place matrix transposition. The second exemplary embodiment extended this concept of in-place matrix transposition to include packed format data (e.g., data of triangular or symmetrical matrices), using column swaths.

The second above-identified copending application provides a method of using square submatrices that can then be transposed in-place, and the third above-identified copending application provides a method of converting triangular/symmetrical matrix data into a rectangular data structure.

The present invention provides additional aspects to concepts of the first of the above-identified copending applications, including some generalizations.

As an example of the type of data transformations that the present invention can make more efficient, there are in-place algorithms for matrix transposition that works on individual matrix elements. Because the individual matrix elements must be referenced in an essentially random order for large M and N these codes run very slowly. U.S. Pat. No. 7,031,994 to Lao, et. al., partially addresses this problem.

However, as explained in more detail below, the results of Lao have quite limited scope. In many instances where the technique works, a fair amount of extra storage is used. They assume the underlying permutation is known but give no indication on how they find this structure or the amount of extra storage required.

Thus, as demonstrated by Lao, a need continues to provide methods that improve efficiency of matrix processing in computers, particularly in view of shortcomings or deficiencies of newer computer architectures.

SUMMARY OF THE INVENTION

In view of the foregoing, and other, exemplary problems, drawbacks, and disadvantages of the conventional systems, it is an exemplary feature of the present invention to provide a structure (and method) in which in-place data transformations are more efficiently executed on a computer.

In a first exemplary aspect of the present invention, described herein is a computerized method for an in-place transformation of matrix data, including, for a matrix A stored in one of a standard full format or a packed format and a transformation T having a compact representation, choosing blocking parameters MB and NB based on a cache size; working on a sub-matrix A1 of A, A1 having size M1=m*MB by N1=n*NB and saving any of a residual remainder of A in a buffer B, the sub-matrix being worked on as follows: contiguously moving and contiguously transforming A1 in-place into a New Data Structure (NDS), applying the transformation T in units of MB*NB contiguous double words to the NDS format of A1, thereby replacing A1 with the contents of T(A1), moving and transforming NDS T(A1) to standard data format T(A1) with holes for the remainder of A in buffer B, and contiguously copying buffer B into the holes of A2, thereby providing in-place transformed matrix T(A).

In a second exemplary aspect of the present invention, described herein is a computerized method for an in-place transformation of sub matrix data of matrix data represented in NDS format. It is also shown that this is impossible for the standard formats of DLA. For a specific NDS it shown that any full matrix can be transposed in several ways all of which are faster than if the matrix was in a standard data structure.

In a third exemplary aspect of the present invention, also described herein is an apparatus including a memory to store a matrix A in one of a standard full format or a packed format and instructions for performing a transformation T having a compact representation, at least one cache, and a processor choosing blocking parameters MB and NB based on a cache size of said at least one cache and working on matrix A in the manner of the method just described.

In an exemplary fourth aspect of the present invention, also described herein is a machine-readable medium tangibly embodying a program of machine-readable instructions executable by a digital processing apparatus to perform a computerized method for an in-place transformation of matrix data, as described above.

In an exemplary fifth aspect of the present invention, also described herein is a computerized method for an in-place transformation of matrix data, including, for a matrix A data stored in a New Data Structure (NDS) format and a transformation T having a compact representation, forming a sub matrix block A1 of the NDS format data of size MB by NB, the NDS representing data of the matrix A in a format other than a row major format or a column major format such that the data for the matrix A is stored contiguously in an order predetermined to provide the data for a matrix processing, and applying the transformation T to the MB by NB block A1, using an in-place transformation processing, thereby replacing data of the block A1 with the contents of T(A1).

BRIEF DESCRIPTION OF THE DRAWINGS

The foregoing and other purposes, aspects and advantages will be better understood from the following detailed description of an exemplary embodiment of the invention with reference to the drawings, in which:

FIG. 7 shows a M=10 by N=5 size matrix A and an m=3 by n=2 sub matrix A(3:5,1:2).

FIG. 8 shows B, the transpose of matrix A and the corresponding n=2 by m=3 sub matrix B(1:2,3:5).

FIG. 9 shows exemplarily a sub matrix A1 800 in column major format with LDA=m, and its register block (ReB) format 901;

FIG. 10 shows sub matrix A1 after transformed in-place by calling VIPX four times;

FIG. 11 shows sub matrix B 1100 in column major format with LDB=k, using four column swaths;

FIG. 12 shows the first column swath E 1200 of sub matrix B 1100;

FIG. 13 shows swath E after transformation;

FIG. 14 shows sub matrix C1, called C and sub matrix F which is C in register block format.

FIG. 15 shows sub matrix C1, after transformation to register block format F1.

FIG. 17 illustrates an exemplary hardware/information handling system 1700 for incorporating the present invention therein; and FIG. 18 illustrates a signal bearing medium 1800 (e.g., storage medium) for storing steps of a program of a method according to the present invention.

DETAILED DESCRIPTION OF EXEMPLARY EMBODIMENTS OF THE INVENTION

Figure 1:
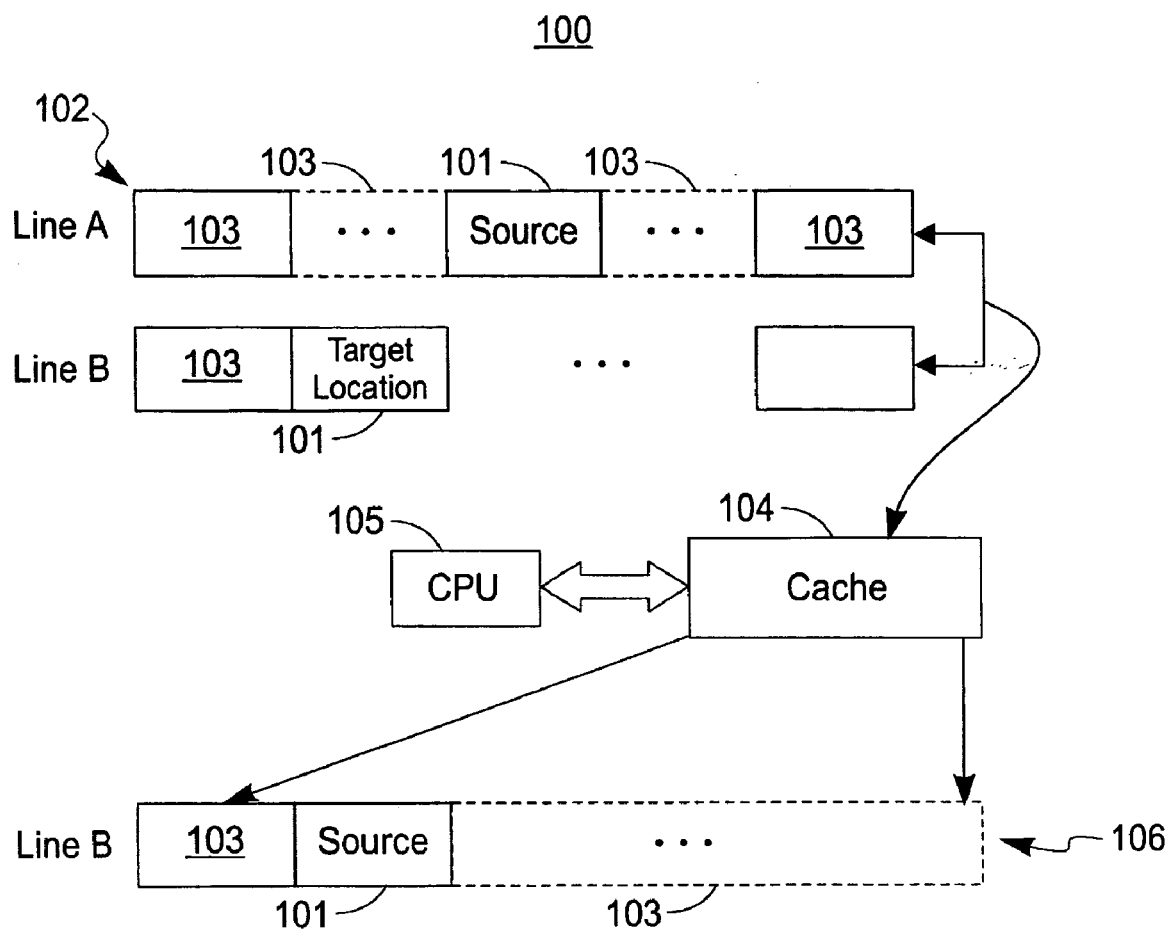
FIG. 1 shows the problem with conventional in-place data transformations 100.

Turning now to the figures, various exemplary embodiments of the present invention will now be described. One possible application utilizing the methods of the present invention is a more efficient method of in-place matrix transposition, one that has generic capability regardless of its size and shape of the given input matrix.

However, transposition of matrix data is only one possible application of the method of the present invention, since it is directed to the more generic problem of performing an in-place transformation of a matrix represented in one of the two standard formats of matrices to the same matrix data in another matrix format such as new data structures (NDS) where it will be able to apply the transformation in a fast manner.

The present invention is also directed to another more generic problem of performing an in-place transformation of any sub matrix represented in a NDS format of a matrix to the same sub matrix data in another NDS sub matrix format where it will be able to apply the transformation in a fast manner An example is the matrix transposition discussed in Lao, et al. Several other examples will now be given. NDS for the two standard formats of matrices, full and packed matrices, are given in "High-performance linear algebra algorithms using new generalized data structures" by Gustavson. For full format, the square block (SB) format of order NB is defined as an example of an NDS. In the present invention, we generalize NDS to include a rectangular block (RB) format of size MB by NB, as well as a register block (ReB) format of size mb by nb of a RB of a NDS.

Other examples of possible applications of the present invention are to transpose a RB matrix of size M by N in-place. Another example is to transform a lower Square Block Packed Format (SBPF) matrix to an upper SBPF matrix. A third example is to transform a packed matrix to a Rectangular Full Packed (RFP) matrix, as described in the second above-identified co-pending application. A fourth example is a RB of a NDS to ReB. All four examples here admit inverse transformations, so these really represent eight examples. Moreover, there are combinatorial numbers of such examples, as this continuation demonstrates that we can now deal with sub matrices and multiple ways to perform transformations on them.

In the context of the present invention, the term "transformation" means that N data points map into each other as a permutation of the originally-stored N data points. The term "in-place" means that the permutation of N data points is returned to the same memory locations as that used for the original data. A typical transformation will be accomplished by using a CPU of the computer to perform the transformation mapping algorithm.

The term "NDS", standing for "new data structures", is a term describing novel ways of storing the elements of full and packed matrices in a computer. The idea behind NDS is to represent the storage layout of a matrix as a collection of contiguous sub-matrices each of size MB by NB. In one embodiment, such as described in the second above-identified co-pending application, MB and NB are chosen so that MB*NB is about the size of the working area of a cache when used for matrix processing.

The present invention addresses the problem noted by the inventors that a data transformation, including in-place data transformations, involves a mapping between the original data stored in memory and the data as rearranged by the transformation.

The problem being more specifically addressed involves the inefficiency resultant from conventional transformation methods applied to matrices in standard formats wherein data to be moved must be moved as single words randomly to other single words in the memory space. This happens almost all the time when the data in matrices is represented in standard matrix formats. When data is retrieved from memory and moved to a cache for purpose of the transformation processing, the desired data word is located in memory and retrieved as one data word of a chunk of memory words called a memory line of size LS that will, in general, contain LS−1 other words that are not applicable for the processing or at least not immediately needed for the processing. A typical value of LS is 128 bytes or 16 double words.

Therefore, in recognizing the random nature of data movement governed by the matrix transformations for matrices stored in standard formats, the present inventors recognized that data transformations of single words of data can be quite inefficient, because the data retrieved for executing the transformation algorithm by the CPU will, in general, only contain only one of LS words that will be consumed by the transformation algorithm.

Thus, in view of the above description, efficiency of data transformations can be improved by ensuring that all data currently needed for the execution of the transformation algorithm are being retrieved from memory as contiguous lines of size LS, thereby precluding the needless handling of data not currently needed nor wanted.

NDSs also exactly generalize the use of standard FORTRAN and C two-dimensional arrays when these arrays are used to hold matrices. The unit of a data item in these arrays is a scalar, $a(i,j)$, but matrix theory allows for the partitioning of a matrix into conformal sub matrices so that a data item can also be considered to be an "array or a matrix=$A(i:i+Mb-1, j:n+NB-1)$" instead of a single scalar element, $a(i,j)$. NDSs additionally store these sub matrices contiguously in the sub array so that this procedure amounts to a form of automatic cache blocking in a best possible manner. In one aspect, this continuation-in-part extends NDSs to have the useful feature that these sub arrays or sub matrices can be transformed in-place. These in-place transformations can be done in a fast manner.

Dense Linear Algebra Factorization Algorithms (DLAFA) have identical algorithms using standard and NDS layouts of the matrix A that is being factored. See Gustavson papers from 1999 to 2003. These papers also show that DLAFA consist mostly of performing various matrix multiplications algorithms (MMAs) on the matrix A. Now, MMAs, and hence DLAFAs, require cache blocking and matrix transposition. Previously, these sub matrix transformation were done out-of-place. This invention, in combination with NDS, allows for these transformations to be done in-place by fast methods.

DETAILED DESCRIPTIONS OF EXEMPLARY EMBODIMENTS OF THE INVENTION

FIG. 1 shows exemplarily how a typical conventional in-place data transformation 100 occurs, wherein data word 101 of interest is retrieved as one word in a memory line 102 containing additional words 103 that, in general, will not be needed in the transformation algorithm immediately by the transformation. Only data word 101 will be processed at the present time from line 102 using the transformation algorithm by moving the data into cache 104, using the CPU 105 for executing the transformation, and returned to memory in accordance with its new location for the data word 101.

The remaining data words 103 will not be used in the immediate transformation processing. In general, the data word 101, and its neighbors 103 retrieved from memory for the transformation processing is more or less "randomly placed" in memory, when viewed from the perspective of how data is actually processed during the transformation. Hence, the neighbors of word 101, words 103 will almost never be used during this time instance of processing. Of course, the words 103 may well be processed at later time instances, and some may have already been processed in earlier time instances.

Figure 2:
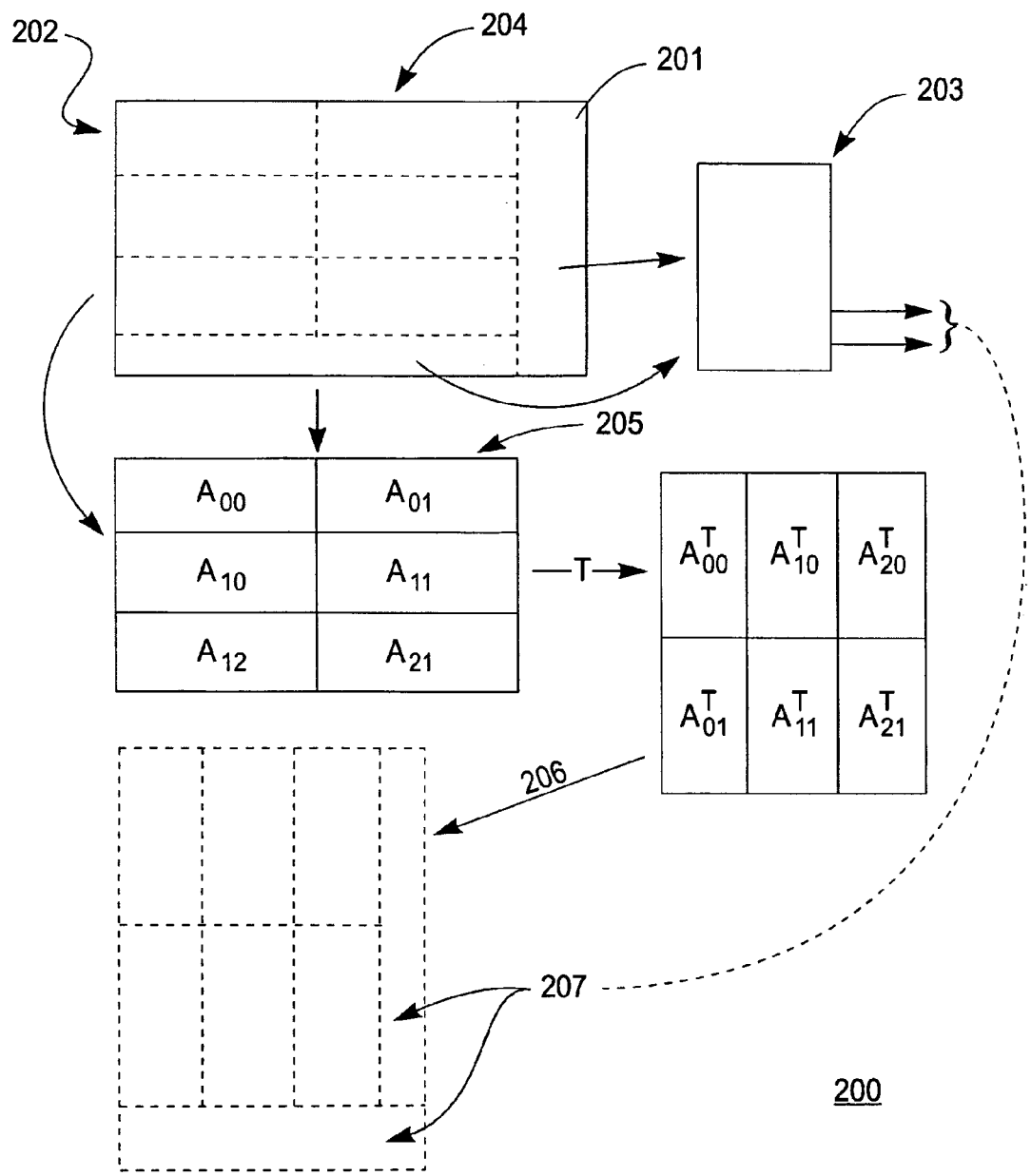
FIG. 2 shows one concept 200 of the present invention wherein a small amount of residual data is separated out and subsequently placed back into holes left after the bulk of the data has been transformed.

In contrast, as exemplarily shown in FIG. 2, as a description of the general concepts 200 of the present invention, rather than retrieving data for a transformation from memory as prescribed by transformation T in a random manner shown in FIG. 1, the present invention teaches to save a tiny piece 201 of the matrix 202 in a "buffer" B 203 and then contiguously move or contiguously transform the remaining matrix A1 204 to a NDS called rectangular block (RB) format 205.

Transformation processing T can now be applied to the RB matrix 205, but now each single element move is a RB move of size MB*NB contiguous elements (e.g., A00, . . . A21). This result can be returned to standard format using contiguous moves or contiguous transforms 206 (with holes 207 for the contents of the buffer B 203) by fast move or other fast transform operations. Finally, the buffer B contents are copied into the holes 207.

Thus, by reason of this buffer saving and moving or transforming to RB format, T can be applied to RB's. The move or transform steps and their reverse steps will consist of data movements on vectors of contiguous data. Hence, all these data movement will be done at the fastest possible memory rates on today's processors. More data is moved; however, it is moved at the maximum rate and overall the processing time is reduced. This overcomes the inefficiency of handling data needlessly or data not even related to the processing. In an exemplary embodiment, the data is always moved as a blocks or vectors of contiguous data.

In contrast to the conventional method, the present invention teaches that in-place data transformations of matrices stored in standard format will process much more efficiently when time is taken preliminarily to place the data into NDS consisting of blocks representing sub matrices.

The size of the data blocks and vectors depends upon the cache and line sizes of a specific computer and operating system and might be, for example, a memory line of data, as a minimum, but would more typically include multiple memory lines of data. The block and vector sizes will also depend upon the size of the working area of the cache into which memory data is retrieved for processing by a CPU (central processor unit). The small amount of data moved into the buffer space is the additional amount of space that the NDS requires over the standard input data. Since we must use the original array area we produce a slightly smaller instance of the original data and save two of its borders in the buffer.

The data transformation processing on NDS will then take each data block and execute the transformation very efficiently using the contiguous data of the blocks. In an in-place transformation, the transformed data will then be returned to a different memory location from which it was retrieved. Another requirement of the present invention is that of "compact representation" of a transformation. A transformation T (permutation) of size N maps 0 to N−1 onto itself. The transformation T is compact if it can be represented by a formula that uses a constant amount of space, independent of N.

For example: N−1=m*n−1, where m and n are the row size and column size of a matrix A. let k=i+m*j and T(k)=j+i*n, where 0≦I≦m and 0≦j≦n. so 0≦k≦N. Here (i,j) represents the storage address of A(i,j). This description of T is compact because there a formula requiring constant space that specifying where any given element of A gets mapped to under T.

In contrast, an example of a non-compact description is: m=3, n=2, N=6 T(0)=4, T(1)=3, T(2)=2, T(3)=5, T(4)=0, T(5)=1. This description is non-compact because it takes as many storage elements to describe the transformation as there are number of elements to be transformed.

Returning now to the specific example of data transformation as being matrix transposition, such as described in Lao et al., the new invention presents a solution that works in all cases, rather than specific examples such as described therein.

The present invention is based on choosing a block size MB by NB where MB*NB usually lies somewhere between the size of L1 and L2 caches. If M is not a multiple of MB or N is not multiple of NB then not more than N*MB+(M−MB)*NB extra storage is required for the buffer B. This concept of block size as based on cache sizes is referred to herein as "cache blocking." It is noted that "buffer" is used as a generic term that implies a bit of additional memory and could be a hardware buffer but would more typically be a small portion of memory that is used to store the data. Thus, in this context, "buffer" would mean "buffer space" in the memory.

The additional preliminary step of rearranging data into contiguous blocks based on block size can be advantageously used for both performance reasons and storage reasons in many applications of Dense Linear Algebra, in addition to transposition example discussed herein.

The following discussion also shows that cache blocking described in the second of the above-identified co-pending applications is amenable to in-place matrix transposition. The advantage is a huge performance gain.

The conventional method demonstrated in Lao et al. has an incomplete vector solution or a square block solution. This means it only works in relatively few cases. Where it fails, slow solution methods as described above in FIG. 1 will be used. Furthermore, the present inventors view the invention described in Lao as potentially non-enabled, since there are numerous places where sufficient detail is lacking. Finally, relative to the present invention, the methods of Lao use too much additional storage, as will be demonstrated shortly.

It is noted that the novel solution described in the present invention also has a good symmetric multi-processor (SMP) parallel implementation.

Moreover, other Dense Linear Algorithm matrices, such as full triangular matrices and packed triangular matrices, are also amenable to the main idea of this method, as demonstrated by the exemplary second embodiment discussed later.

An Example of the First Exemplary Embodiment

The following discussion provides an example using a matrix of size 1000 by 147. It is noted that there is no need in this example to store a small residual amount in a buffer space, since the choice of MB and NB happens to consume all of the original data.

Figure 3:
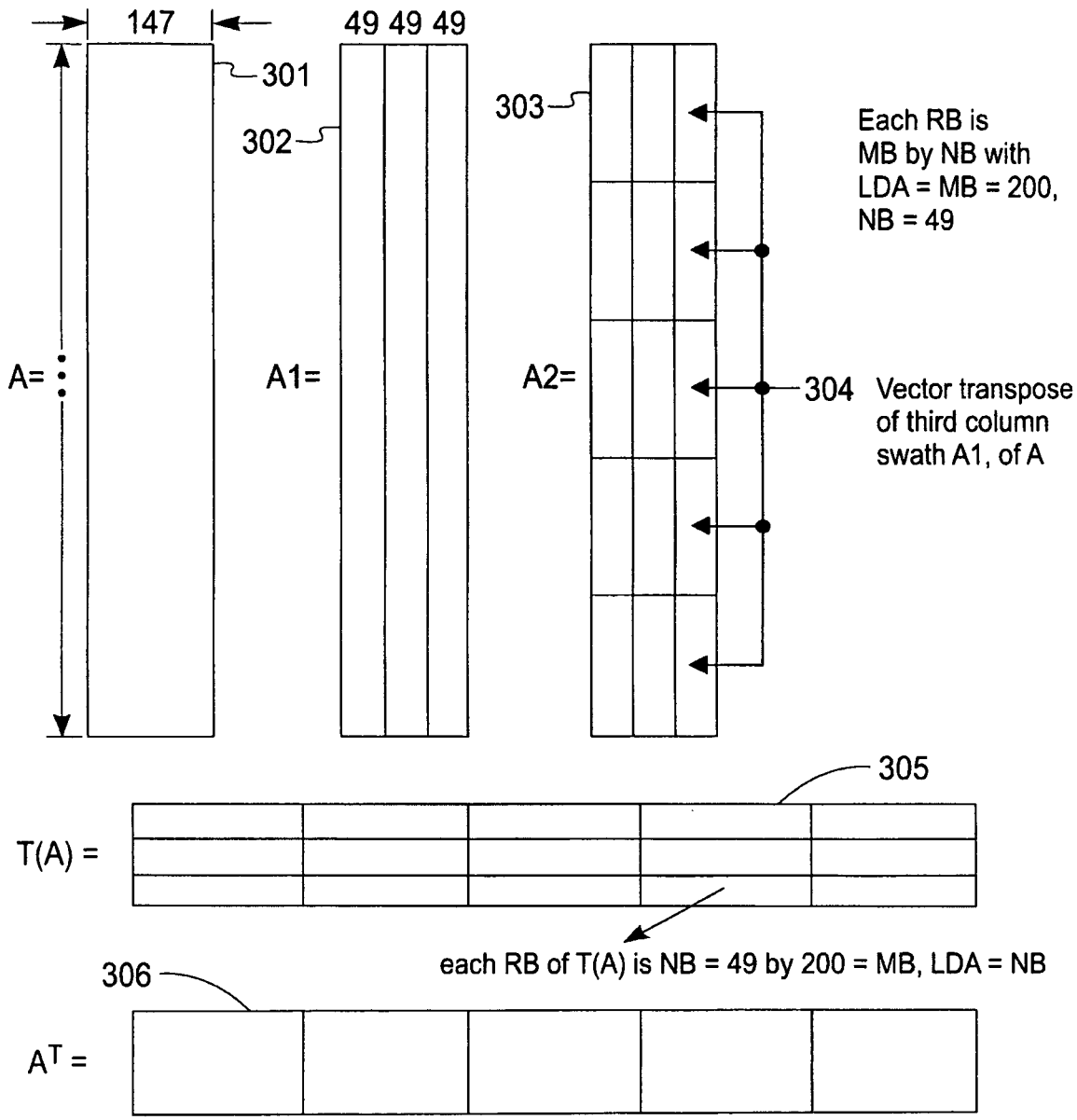
FIG. 3 shows the method 300 of the present invention as used in an example with matrix A being size 1000×147.

FIG. 3 shows graphically 300 this example, using exemplarily a matrix A, 301, of size M=1000 rows by N=147 columns. The format of matrix A is the standard Column Major (CM) order of the FORTRAN and C programming languages. The LDA of A is equal to M.

In a first step, the M by N matrix A has its format changed in-place to Rectangular Block (RB) format 302 where the size of each RB 303 is MB by NB with MB=200 and NB=49.

That is, matrix A 301 can be considered to be broken down into three columns swaths, each having five smaller sub matrices A1, 303, all sub matrices having size MB=200 by NB=49. Note that Steps 1 and 2 of the IRX algorithm, provided ahead are no-operations and that MB is unequal to NB.

An in-place vector transposition is then performed on each column swath A1, 302, resulting in a vector transpose 304 part of 303 of each A1. During this vector transpose each of the three A1's are transformed from standard CM format with LDA=1000 to a RB format where each RB has an LDA=200. The vector length is MB=200 and the rectangular matrix VM of vectors is size m by NB or 5 by 49. The mapping MAP(k)=mod(k*NB,Q) where Q=m*NB−1=244=2^2*61. Here k=i+LDA*j where LDA=m represents the (i,j) element of VM and 1≦k<Q. This modulus Q has six divisors, 244, 122, 61, 4, 2, 1. Each divisor d gives rise to cycles lengths, cL, that divide φ(d)=120, 60, 60, 2, 1, 1. We find cL=30, 30, 30, 2, 1, 1 for these six divisors. Also, there are 4, 2, 2, 2, 1, 1 leaders associated with these six divisors as # of leaders, nL, times cycle length=φ(d)=4*30, 2*30, 2*60, 2*1, 1*1, 1*1. Vector elements (0,0) and (m−1,NB−1) always map into themselves; they are called singleton cycles. Let us follow the cycle starting at k=1. k=1 is always a leader for each divisor d.

The coset generated by leader 1 for divisor d=244 is

| 1 | 49 | 205 | 41 | 57 | 109 | 217 | 141 | 77 | 113 |
|---|---|---|---|---|---|---|---|---|---|
| 169 | 229 | 241 | 97 | 117 | 121 | 73 | 161 | 81 | 65 |
| 13 | 149 | 225 | 45 | 9 | 197 | 137 | 125 | 25 | 5 |

The other three leaders are 3, 7, and 17. The remaining 90 elements are obtained by multiplying the coset 1 cycle by the leader and taking the result mod Q=244.

The coset generated by leader 1 for divisor d=122 is

| 1 | 49 | 83 | 41 | 57 | 109 | 95 | 19 | 77 | 113 |
|---|---|---|---|---|---|---|---|---|---|
| 47 | 107 | 119 | 97 | 117 | 121 | 73 | 39 | 81 | 65 |
| 13 | 27 | 103 | 45 | 9 | 75 | 15 | 3 | 25 | 5 |

The other leader is 7. The remaining 30 elements are obtained by multiplying the coset 1 cycle by the leader and taking the result mod d=122. It is to be noted that these 60 values should be multiplied 2, the divisor associated with 122.

The coset generated by leader 1 for divisor d=61 is

| 1 | 49 | 22 | 41 | 57 | 48 | 34 | 19 | 16 | 52 |
|---|---|---|---|---|---|---|---|---|---|
| 47 | 46 | 58 | 36 | 56 | 60 | 12 | 39 | 20 | 4 |
| 13 | 27 | 42 | 45 | 9 | 14 | 15 | 3 | 25 | 5 |

The other leader is 2. The remaining 30 elements are obtained by multiplying the coset 1 cycle by the leader and taking the result mod d=61. It is to be noted that these 60 values should be multiplied 4, the divisor associated with 61.

The coset generated by leader 1 for divisor d=4 is a singleton cycle. The other leader is 3. These two values get multiplied by 61, the divisor associated with d=4.

The coset generated by leader 1 for divisor d=2 is a singleton cycle. This value gets multiplied by 122, the divisor associated with d=2.

The coset generated by leader 1 for divisor d=1 is a singleton cycle. This value gets multiplied by 244, the divisor associated with d=1.

So, there are 12 cycles in all of lengths 30, eight times and length 1, four times. According to our theory, it is clear that only the twelve cycles leaders are needed to generate all 244 elements of the mapping. This is step 3 of IRX coding given later, and subroutine VIPX is called n=3 times. Each A1 has now become an A2, 303, and consists of m=5 RB's of size MB*NB=49000. Now A is a concatenation of the n=3 A1's, 304 and, hence, A is now in RB format consisting of an m=5 by n=3 RB matrix. Call this RB matrix A2, 303. Each (i,j) element of A2 is an RB. A2 has 5 block rows and 3 block columns. See A2 at 303, 304. Now we turn to the block transpose map in box 305. The Block Map M=map(i,j)=mod (j+3*i,14). We follow (1,0) which cycle length $\phi(14)$=6: 1 3 9 13 11 5. Since, in this case cL=$\phi(14)$ there is only one leader. Next we follow (2,0) which has cycle length 6 associated with divisor d=7 of Q=14 getting cycle 2*(1 3 2 4 6 5). Since, cL=$\phi(7)$ there is only one leader. The remaining two divisors of Q are 2 and 1 and give singleton cycles 1, 1 whose values get multiplied by 7 and 14 respectively.

Block Map M^-1=inverse map(i,j)=mod(j+5*i,14).

We follow (1,0) which has cycle length 6: 1 5 11 13 9 3.

Next we follow (2,0) which has cycle length 6: 2*(1 5 4 6 2 3).

Note that M^-1 has the cycles going backwards instead of forwards. This is always true in our theory.

We now describe the Block Map M=map(i,j) in high level detail. Full details are given in reference "In-place Transposition of Rectangular Matrices" by Gustavson and Swirszcz [GS] where our point theory is fully described.

The cycle of (1,0) of length 6 is moving sub matrix blocks of size MB*NB=9800. Hence i refers to memory locations i*9800:(i+1)*9800−1. For example, take i=11. The map M says take the block at 11*9800:12*9800−1 and move it transposed to the block at M(11)=13 or 13*9800:14*9800−1.

The modulus Q=m*n−1=5*3−1=14=2*7. 14 has 4 divisors.

| d | $\phi$(d) | cL | # c | d | $\phi$(d) | cL | # c |
|---|---|---|---|---|---|---|---|
| 14 | 6 | 6 | 1 | 1 | 1 | 1 | 1 |
| 7 | 6 | 6 | 1 | 2 | 1 | 1 | 1 |
|   | 12 |   | 2 |   | 2 |   | 2 |

The Block Map M get divided into 4 disjoint sub-problems each governed by Eulers (p function applied to one the 4 divisors of Q. For example $\phi$(Q) is 6 and there are 6 elements of A2 that are relatively prime to Q. One of these is (1,0) corresponding to integer 1 which is relatively prime to Q. Integer 1 generates a cycle of length 6.

This single cycle generates all $\phi$(Q) elements of A2 relatively prime to Q. So, divisor Q will handle all 6 elements of A2 as a single cycle of length 6. There are three more disjoint problems to handle, each associated with one of the remaining three divisors of Q. For each of these three divisors d the size of the problem is $\phi$(d) elements of A2. We state that every one of these $\phi$(d) elements of a given problem of size d constitute $\phi$(d) elements of Block A2 that are randomly placed in Block A2. So, according to the Block map M these $\phi$(d) block elements of A must be accessed in a block random manner.

Now we come to one of significant points of the method of the present invention. The elements within a block are contiguous. Recall that MB=200 and NB 49. Each sub matrix block contains MB*NB=9800 elements, which are stored in 9800 contiguous memory locations. A common line size is 16 double words. The entire block is brought from memory as 612.5=9800/16 lines. This is the fastest possible form of memory transfer to cache. Furthermore, every element of each of these 612.5 lines will be used as this sub matrix block is moved to another empty contiguous memory location consisting MB*NB double words.

At this point, we have T(A) or box 305. Note that each 200 by 49 block has been transposed to be a 49 by 200 block with LDA=49. In box 306 we need to take each of the 5 sets of column swaths and transform each set from RB format to CM format. See step 5 of IRX in the pseudo code provided in the discussion ahead. Step 5 is the inverse operation of step 3. We saw above that this inverse operation computes the same cycle structure but in reverse order. We will therefore apply step 3 again with the vector matrix VM^T of size MB by n of vectors of length NB. The mapping MAP(k)=mod(k*n,Q) where Q=MB*n−1=599, a prime. Since Q is prime, there are only two divisors d=599, 1 and we have only two sub problems of size $\phi$(d)=598, 1. The cycle lengths, cL,=299, 1 and the leaders are 1,7 1. We only list the first ten elements of coset 1 due to length being 299:

1 3 9 27 81 243 130 390 571 515 . . .

Note, to find MAP(243) write 243*3=729=1*599+130=130 mod(Q).

On applying step 5 ahead m times gives the result is box 306 and the matrix there is in CM format with LDA=147. This the final answer.

Lao does not mention any of this permutation detail of our invention in his patent. Lao does say that his permutations occupy Q space, plus pointer space for the cycle leaders. Our theory says that every problem has Q=m*n−1 and that the number of cycles is usually much less than Q.

Now we can suggest what Lao would do with this problem. Lao's patent works with q columns of A n times. Here N=147=n*q. q should be large but M*q should fit into cache. In Lao, N=q*n. Let us set q=7, so that n=21. In Box 108 of Lao he says "apply a permutation to the matrix". We think Lao means that his matrix is a vector matrix VM of vectors of length q with M rows and n columns. What Lao wants is VM^T. According to our theory, the mapping MAP(k)=mod (k*n,Q) where Q=M*n−1=20999. Here k=i+LDA*j where LDA=M represents the (i,j) element of A and 1≤k<Q. Now, k=1 corresponding to vector element (1,0) of length q=7 has a cycle length cL of size 902 which is a divisor of $\phi$(Q). Now Q=11*23*83 and $\phi$(Q)=2^3*5*11*41. Our theory tells us cL=902 and so there are $\phi$(Q)/cL=20 leaders for this sub-problem. They are 1,43, 2,86, 3,19, 4,172, 5,38, 8,44, 9,57, 15,29, 16,71, 32,87. Lao does not say how he finds these 20 leaders which is only part of the problem of finding permutation P associated with vector matrix VM. Lao does say he explicitly stores P whose length is 21000. The remaining part of Lao's problem, according to our theory, would examine the remaining seven divisors of Q=1909, 913, 253, 83, 23, 11, 1. Taking $\phi$ of these divisors one gets 1804, 820, 220, 82, 22, 10, 1. The cycle lengths, cL=902, 82, 22, 41, 22, 2, 1. The associated leaders are 11*(1, 2), 23*(1,32, 2,9, 3,8, 4,15, 5,16), 83*(1, 2, 3, 4, 5, 8, 9, 15, 16, 32), 253*(1,2), 913, 1909*(1, 2, 3, 4, 5), 20998. Finally, 0 is singleton cycle so the number of leaders is 52 for Lao's invention.

Additionally, Lao stores all the cycle leaders as pointers. So, Lao stores 21052 words which is a 7.16% storage overhead. In boxes 104 and 106 of FIG. 1 of Lao a buffer of size M*q=7000 double words is required. This is nearly a 4.76% storage requirement. Lao's storage requirement is 11.92%.

Finally, Lao's vector length is q=7. Since LS is 16, Lao only obtains 43.75% efficiency; 9 of 16 elements in every line is not used due the random nature of the mapping.

Thus, from the above example, it can be seen that a key idea of the method of the present invention is to convert a matrix A having size M by N in standard CM format into RB (Rectangular Block) format. This can be done by a series of fast transformations. One gets a smaller RB matrix A2 of size m by n where M=m*NB and N=n*NB. One finds the cycle structure of A2 by applying the point algorithm of GS to A2. In matrix A2 each cycle move in A2 consists of moving the transpose of a size MB by NB sub matrix of A2 to another empty location of A2 of size MB*NB. A buffer of size MB*NB is required do all of the moves. This is a (100/(m*n))% storage requirement or 6.67% for the m=5 by n=3 example.

When M is not a multiple of MB and N is not a multiple of NB there are two sub matrices of size r by N and s by M that border A in its last r rows and its last s columns. r=M−m*MB and s=N−n*NB. These sub matrices are moved to a buffer B and then one can deal with a truncated matrix A1 of size M−r by N−s. Note that A1 has its row size M1 and its column size N1 as multiples of MB and NB respectively. We now identify A1 with the matrix A in what follows. So, A1 here will have the same size as the RB matrix A2 above. A1 is currently in column major (e.g., CM) order.

We now briefly describe how one gets from standard column major (CM) format to RB format. Let M=m*MB and consider NB contiguous columns of CM A1 where N=n*NB; call this matrix A3.

Think of A3 as an m by NB matrix whose elements are column vectors of length MB. A3 is a column swath of matrix A1. There are n swaths and they constitute the full A1. Now, apply the point algorithm described in "In-place Transposition of Rectangular Matrices", by Gustavson and Swirszcz, to this m by NB matrix A3 of vectors of length MB. The result is that now A3 has been replaced (over-written) as A3^T which is a size NB by m matrix of vectors of length MB.

It turns out, as a little reflection will indicate, that A3^T consists of m RB matrices of size MB by NB concatenated together. One can do this operation in parallel for each of these n=N/NB sub matrices A3 of A1. After completion of these n parallel steps one has transformed CM A in-place to be A2 as a RB matrix consisting of m*n RB's.

The process of going from an A2 in RB format to an A1 in CM format is the "transpose" of the above procedure; i.e., given NB by m A3^T one transposes A3^T to (A3^T)^T (=A3) in-place to get m by NB A3 in CM format.

Figure 4:
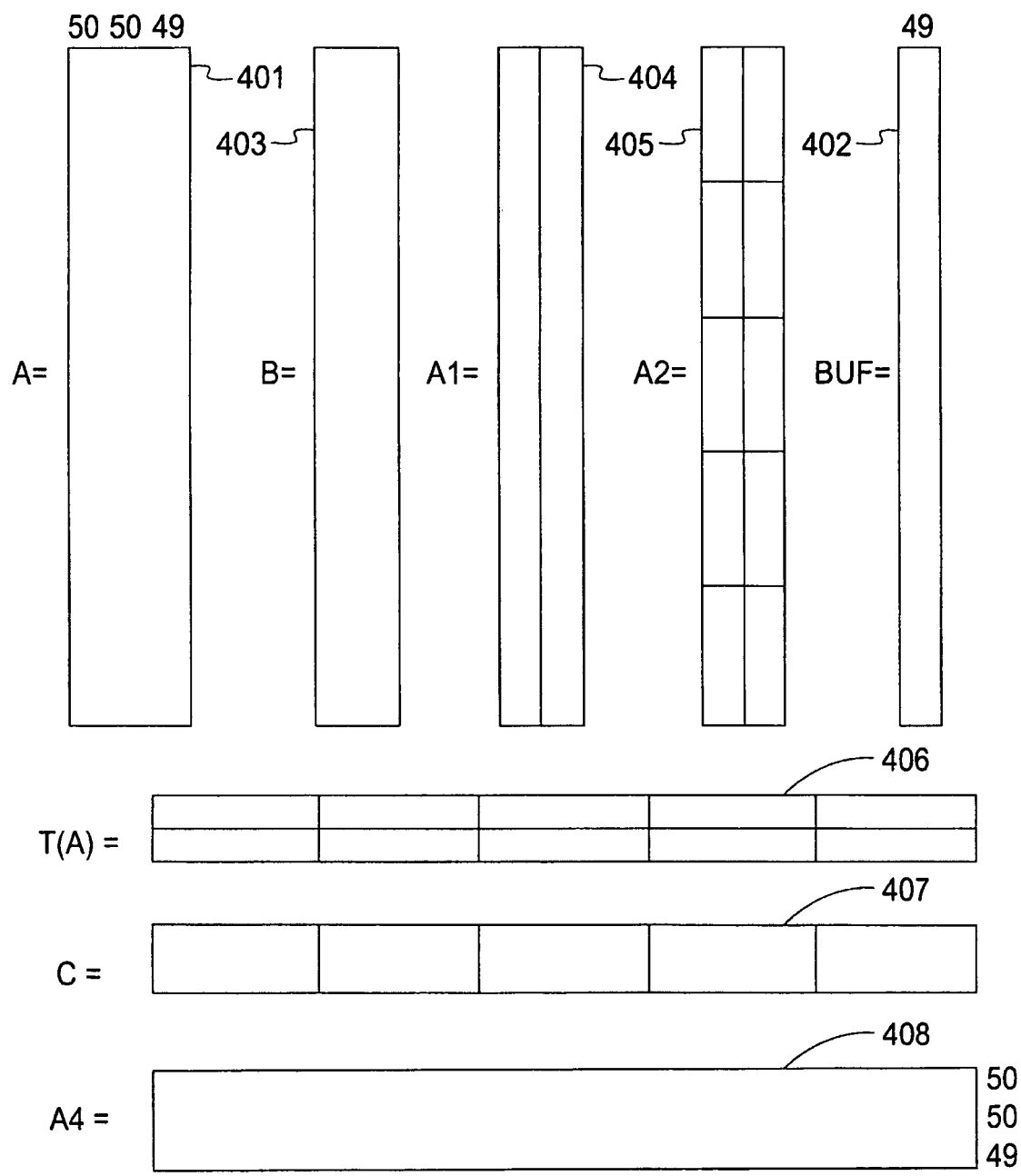
FIG. 4 shows the method 400 of the present invention as used in an example with matrix A being size 1000×149.

Suppose M is not a multiple of MB and N is not a multiple of NB, as exemplarily shown in FIG. 4. We save the last r rows of A and the last s columns of A in a buffer S. As an example, let M=1000, N=149, LDA=M, MB=200, NB=50. Then M M1+r=m*MB+r with M1=M, m=5 and r=0. Also, N=N+s=n*NB+s with N1=100, n=2 and s=49. The values MB and NB were chosen based on the cache sizes of the machine that algorithm IRX is to be run on. It is important to realize that the MB and NB of our invention do not depend on M and N. Based on these choices of MB and NB we have carried out Step 0 of IRX ahead.

FIG. 4 shows A at 401, and the s columns copied to buffer BUF at 402. This is Step 1 of IRX, ahead.

Next, we move forward the first m*NB rows and n*NB columns of A into a compact space of size m*MB*n*NB. In step 2 of IRX ahead A(0:M1−1,0:N1−1), matrix A, 401, is moved to A(0:M1*N1−1), 402. Since, r=0, this step 2 becomes a no operation. In general, this step is not a no operation.

Call this new compact matrix B. B has its M a multiple of MB and its N a multiple of NB. See matrix B, at 403 in FIG. 4. We can transpose B in place by the methods we have already described in steps 3 to 5 of IRX ahead. We briefly give the details as it pertains to FIG. 4. In step 3 of IRX ahead, n=2 calls are made to VIPX, with vector length equal to MB, and VM of size m=5 by NB=50. See FIG. 4, matrix B, at 403, being divided into n=two swaths, A1 at 404. Note, the process of going to 404 from 403 is a no operation. Now, Q=m*NB−1=249=3*83. There are four divisors d=249, 83, 3, 1 and thus four sub problems of sizes φ(d)=164, 82, 2, 1. The cycle lengths, cL, associated with these four problems are 82, 82, 2, 1 and the associated leaders are (1,11), 3*1, 83*1, 166*1.

After completion of Step 3 of IRX ahead we have matrix A2 at 405 of FIG. 4. A2 is a RB matrix of order m=5 by n=2. In step 4 of IRX ahead, we call BIPX with RB's of size MB by NB, where A2 is m by n. Here Q=m*n−1=9=3^2. There are three divisors 9, 3, 1 and thus three sub problems of sizes φ(d)=6, 2, 1. The cycle lengths are 6, 2, 1 and the associated leaders are 1, 3*1, 9*1. The result of step 4 is shown as T(A) in 406. In step 5 of IRX ahead, VIPX is called m=5 times with vector length NB=50 on vector matrix VM of size MB=200 by n=2, see FIG. 4, matrix T(A) at 406 becoming matrix C at 407. Again, Q=MB*n−1=399=3*7*19. There are eight divisors d=399, 133, 57, 21 19, 7, 3, 1 and thus eight sub problems of sizes φ(d)=216, 108, 36, 12, 18, 6, 2, 1. The cycle lengths, cL, associated with these eight problems are 18, 18, 18, 6, 18, 3, 2, 1 and the associated leaders are [(1,43), (5,67), (11,31), (13,37). (29,59), (41,43)], 3*[(1,5), (3,5), (9,31)], 7*(1,5), 19(1,5), 21*1, 57*(1,3), 133*1, 399*1 and their total is (12, 6, 2, 2, 1, 2, 1, 1)=27+1=28. (There is always the 0 singleton cycle.)

Call this result of steps 3 to 5 of IRX ahead C=BAT. We then expand C into the space M*N. In FIG. 4, see matrix A4, at 408, where this expansion has been done. Details are given in Step 6 of IRX, ahead. We think this procedure is well known in the art.

We then use the two matrices of buffer S and transpose them out-of-place into the vacant places of the expanded C matrix in A4. For our example of FIG. 4 there is just one of the two matrices as the second one is empty. We have saved A(0:LDA−2,N1:N−1) as ALC in BUF, 402. BUF holds the sub matrix A(0:M−1,N1:N−1) of A. The out-of-place transpose algorithm is well known in the art. This is Step 7 of IRX ahead. For the example of FIG. 4, A(N1:N−1,0:LDA−1) where N1=100, N=149, LDA=M=MM1=1000 is empty before the start of Step 7 of IRX ahead. This empty space, also called holes, was created during Step 6 of IRX ahead where matrix C at 407, residing in array A(0:LDA*N−1) was expanded in A(0:LDA*N−1) to become matrix A4 at 408. There are exactly M holes in A4 and every hole has size N−N1. After Step 7, A4 at 408 has become A^T(0:N−1,0:LDA−1)=A^T and it resides in A(0:LDA*N−1).

We have now described the features of the algorithm IRX.

The pseudo code capable of executing the above verbal description is as follows.

Algorithm In-Place Rectangular Transpose (IRX)

A is an M by N matrix with LDA≧M stored in standard CM format. A is stored in a one dimensional array A(0:LDA*N−1). MB and NB are given blocking parameters.

Step 0: put LDA=m*MB+r and N=n*NB+q. Note, we work with LDA and N instead of M and N. In many cases, LDA=M. Let M1=m*MB and N1=n*NB.

Step 1: save the last q columns of A as a matrix ALC of size LDA by q in buffer BUF. ALCB=A(0:LDA−1,N1:N−1).

Define ALR of size r by N1=A(LDA−M1:LDA−1,0:N1−1). Also, save ALR in buffer BUF.

Step 2: Contraction step: Move in-place A1=A(0:M1−1,0: N1−1) of matrix A to array space A(0:M1*N1−1). This can be done as mostly DCOPY calls on vectors of length M1. There will be a few vectors moves of length M1. In total there will be N1 such DCOPY calls or vector moves.

Step 3: transform CM A1 to RB A1

```
DO J = 0, N1−NB, NB
    CALL VIPX(MB,m,NB,A1(0,J))
ENDDO
```

Step 4: transform M1 by N1 RB A1 to RB A1^T in-place; the result is renamed to be A1. A1 is now N1 by M1.
CALL BIPX(MB,NB,m,n,A1)!A1->A1^T in-place Step 5: transform n by m RB A1 to CM A1

```
Do J=0, M1−MB, MB
    CALL VIPX(NB,MB,n,A1(0,J))
ENDDO
```

Step 6: Expansion step: Move in-place A1=A(0:M1−1,0: N1−1) of matrix A to array space A(0:N*LDA−1). This can be done as mostly DCOPY calls on vectors of length N1. There will be a few vectors moves of length N1. In total there will be M1 such DCOPY calls or vector moves.

Note: on input CM A1 has LDA=N1. On output, A1 has LDA=N and holes have been produced in A1 to receive ACL and ACR which are in BUF. We now rename A1(0:N−1,0: LDA−1) to be A.

Step 7: Use a standard out-of-place transpose algorithm on ALC in BUF to put ALC^T in
A(N1:N−1,0:LDA−1) and on ALR in BUF to put ALR^T in A(0:N1−1,
M1:LDA−1).

The SMP parallel algorithms for steps 3 and 5 are embarrassingly parallel as these two block do loops each do exactly the same algorithm on equal size sub matrices.

The SMP parallel algorithm for Step 4 is obtained by letting different processors move the disjoint cycles associated with the small m by n matrix A2. If A2 only has a few large cycles then one cuts these cycles into several pieces. Each processor can move a disjoint piece of a single large cycle. These ways requires more buffers of size MB*NB. Alternatively, when MB*NB is very large, say of the size of an L2 cache one can let a SMP version of out-of-place transpose obtain this parallelism implicitly. In steps 2 and 6, SMP parallelism can be handled implicitly via many calls to SMP BLAS DCOPY as M1 and N1 are typically very large. Finally, steps 0, 1 and 7 require relatively very little computation. Even so, these operations have standard SMP implementations.

Comparison of the present invention with U.S. Pat. No. 7,031,994 to Lao et al.

We now describe how the method described in Lao et. al. would have done the example matrix of FIG. 4. Recall that M=1000 and N=149 and that A is M by N and A resides in array A(0:LDA*N−1) with LDA=M. Lao has five methods described in FIGS. 1-2, 3-4, 5-6, 7-8, 9-10. Method 2 deals with the square case of M=N. In place transpose routines are well known in the state of the art. Method 3 deals with the case N=kM and method 4 deals with case M=kN. Method 5 deals with the case M=km and N=kn. Here it is safe to assume that k>1 even though Lao does not explicitly say this. This remark, k>1, also applies to his methods three and four.

Now return to the FIG. 4 example. For this M and N, methods two to five are ruled out. Hence, only method one of Lao applies. In method one of Lao, see box 100 of FIG. 1, where there are typos, q=1 and n=N=149 as N is a prime or q=149 and n=1. One chooses the first possibility as Mq represents a block size. At box 102, Lao partitions A into n column swaths of size q. Box 102 appears to be a no operation. Note for matrix A every column swath is a single column of A. In boxes 104 to boxes 106 Lao does an out-of-place transpose of each of the n column swaths using a buffer of size Mq=1000 double words. Finally, in box 108 of FIG. 1, Lao applies a permutation to the transformed matrix A of boxes 100 to 106.

We think that Lao is indefinite at this point. What we will do is use the method of our invention to generate the permutation related to the A of FIG. 4. This procedure is justified as the permutation is unique and any method that finds it must result in the same permutation. According to our theory, the mapping MAP(k)=mod(k*n,Q) where Q=M*n−1=148999. Here k=i+LDA*j where LDA=M represents the (i,j) element of A and 1≦k<Q. Now, Q=37*4027. There are four divisors d=148999, 4027, 37, 1 and thus four sub problems of sizes φ(d)=144,936, 4026, 36, 1. The cycle lengths, cL, associated with these four problems are 671, 671, 1, 1 and the associated number of leaders has sizes 216, 6, 36, 1 plus 1 more for the 0 singleton cycle. There are 260 leaders in all. We do not list these leaders due to their length. In all, this permutation of Lao requires space for additional 149260 words of storage which is more than a 50% extra storage penalty.

Finally, Lao's vector length is q=1. Since LS is 16, Lao only obtains a 6.25% efficiency; 15 of 16 elements in every line is not used due the random nature of the mapping. This is the worst possible scenario.

Our invention, in contrast to Lao's invention, tries to avoid this scenario at all costs. If we return to our invention as it applies to the matrix A example of FIG. 4, we have an eight step procedure for IRX. Lao's method 1 is a two step procedure. In Lao, col. 5, lines 43 to 56 describes his rationale for his invention and the reason behind his choice of method one. In contrast, the central idea of our invention is to prepare the format of the matrix in the memory hierarchy so that its data can always be moved at the "fastest possible rate". Our IRX procedure for doing this can require passing through the matrix five times, Step 2 to 6, as opposed to Lao's method one which only passes through the memory hierarchy twice, boxes 100 to 106, and box 108.

For the matrix example of FIG. 4, our invention by-passes step 2, and then passes through most of A in steps 3 to 6, four times, but in a very fast manner. Lao, on the other hand, passes through all of A twice, once in a fast manner, and once in a very slow manner. Also, Lao uses a vector of words that exceed M*N plus a buffer of M double words. In our invention we use a buffer B of s*M double words, plus a buffer of MB*NB double words.

Having explained the method of the present invention, we now describe how it compares with the method described in Lao. Lao's invention somewhat resembles in its FIGS. 1 and 2 of Lao's method 1 the present invention in its global function. This conventional method assumes its q (our NB) evenly divides N.

In contrast, in the present invention, it is assumed that LDA is equated with M. This means that permutation mapping uses LDA instead of M. In fact, Lao never mentions LDA which we consider to be a very important omission. Lao also states that q is chosen so that M*q columns of A fit into cache. We observe that many matrices, especially large ones have M so large that not a single column of A fits into cache. Let N=n*q. Note that N restricts the choices for q and n to be divisors of N. Also, Lao uses q as a blocking parameter and n as a parameter to fix the size of his permutation.

In FIG. 1 of Lao, the first step, boxes 104 to 106, is to perform n out-of-place transposes of column swaths of A of size q. In each of these n steps the M by q swath is transposed to be a q by M matrix and then this transposed matrix is returned to same memory space that the M by q matrix swath previously occupied. In the present invention, with NB unrelated to q and N>=N1=n1*NB, we have matrix A1 and do an in-place vector transpose of n1 different identical column swaths n1 times. Our buffer is size NB whereas Lao's buffer is size M*q.

It is very important to realize that, in this example, our NB is chosen based on cache size and hence need not be a divisor of N. In fact, if necessary, IRX will perform step 2, changing N to be N1<N and M to be M1<M<LDA so that Steps 3 to 5 will perform faster via the introduction of blocking parameters MB and NB that are based on cache size and therefore are independent of M and N. So, regarding Lao's first pass through A our invention will possibly pass through A two extra times in steps 2 and 6 of IRX to make its Steps 3 to 5 run faster. However, these extra passes through A are used to be able to choose MB and NB arbitrarily. Lao's method cannot do this for his q and Lao also does not block on his matrix size M. Our Step 3 performs a vector transpose where the vector length is MB on an m by NB vector matrix VM and it does so n1 times. Another difference occurs in step 3. IRX applies a vector in place transpose to nt column swaths, each of size NB where N1=n1*NB. Lao, on the other hand, says he wants to avoid this approach and uses an out-of-place transpose algorithm via using a buffer of size Mq. In Lao, col. 5, lines 43 to 56 describes his rationale for his invention and the reason behind his choice of method one. His reason is "to reduce the number of his permutation vectors" In method one he uses just one We add here that his methods 2 and 5 uses no permutation vectors. In IRX, we always use three permutation vectors.

Next, Lao applies a permutation vector, box 108, to the result of their step 1. No details are given about box 108 except in column 10 lines 35 to 50. This 16 line description is considered inadequate or indefinite. Further note that at line 50 there is a break in the continuity of Lao: The matrix beginning at line 52 is a square matrix and this matrix belongs to Lao's description of FIGS. 3 and 4.

Note that lines 12 to 34 of column 10 describe boxes 100 to 106 of FIG. 1. There is some hand-waving here; see lines 20 to 26. Lines 17 to 19 limit Lao in two essential ways. For example, when N is prime, q=1 and performance will greatly suffer. M*q as a block size is a second limitation. It restricts q to be small and his performance suffers when q is small during the execution of box 108.

In column 7, lines 43 to 67 and column 8, lines 1 to 19 Lao discusses details of how he handles his permutation vectors. The total size of the permutation vectors is the size of the block matrices plus the number of cycles. In contrast, the present invention uses only the number of cycles. We remark that the numbers of cycles of a permutation is almost always much smaller than the size of the permutation.

We close this discussion with how box 108 relates to the present invention's IRX algorithm. We have already stated how the present invention IRX differs from Lao in boxes 100 to 106. There are three steps to the present invention's IRX when M=m*MB and N=n*NB. They are steps 3 to 5 above of IRX. Box 108 is also unrelated to step 3 to 5 of IRX. IRX generates three permutation and all of these are unrelated to Lao's one permutation generated in box 108. As mentioned, Lao, in Box 108, only says apply a permutation to the matrix. To us, this clearly appears to be indefinite. What Lao appears to do is to treat the result of boxes 100 to 106 as a vector matrix VM of size M by n whose elements are vectors of length q. Since this permutation vector is unique, we can apply the methods of our invention to find its structure. This is what we did in the examples of FIGS. 3 and 6 so that we could demonstrate how our invention differed from Lao's invention.

Exemplary Second Embodiment

Now we turn to the other standard data structure for matrices call packed matrices. For packed matrices the results are not so nice because the permutation structure of the mapping in the packed case does not share many of the properties of the linear M by N rectangular matrix A case.

In this exemplary second embodiment, the present invention takes a packed matrix A, which is either symmetric or triangular, and transforms it to another matrix format which contains the original data.

Figure 5:
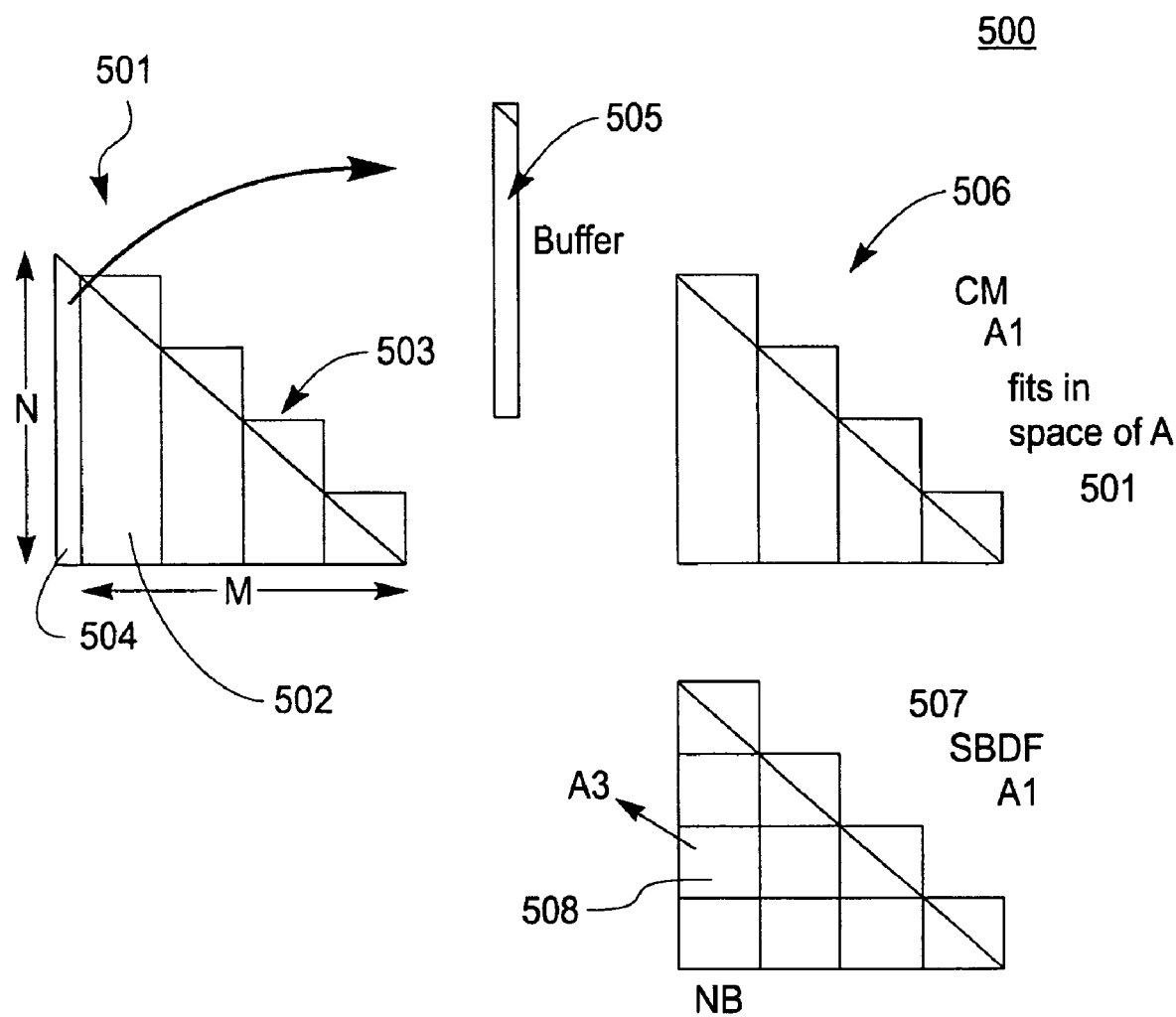
FIG. 5 shows the method 500 of the present invention as applied to matrix data in a packed format.

As exemplarily shown by the method 500 represented in FIG. 5 let matrix A 501 be an order N packed matrix. Matrix A 501 resides in an array AP of size nt=N*(N+1)/2. Let NB be a block size. Let A1 503 be an order M=m*NB Square Block Packed Format (SBPF) matrix representation of A1, a sub matrix 502 of A, whose array size mtb=mt*NB^2 is less than or equal to nt. Here mt=m*(m+1)/2. The first N−M columns 504 of AP are saved in buffer B 505. The remaining M columns of AP are transformed in-place inside the space of AP to form move expanded Column Major (CM) T(A1), as explained in more detail below. Then the remaining N−M columns are retrieved from B and placed back into holes left in moved expanded CM T(A1).

Similar to the first embodiment described above, this second embodiment also can be used for both performance and storage reasons in many applications of Dense Linear Algebra (DLA), and also has good SMP parallel implementation.

This second embodiment also shows that cache blocking is amenable to a matrix transformation T of packed arrays. The advantage is a large performance gain. One could let NB=1. That would be equivalent to using a point form of the transformation which would be about several hundred times slower than a block form of the algorithm. In the point form no extra storage is required. In the block form, a buffer B of size about N*NB is required.

As exemplarily shown in FIG. 5, for the packed format, a key idea is to convert order N packed A of size nt=N*(N+1)/2 into AP into order M=m*NB A1 SBPF format of size mtb=mt*NB^2 and mt=m*(m+1)/2 where N−M is small. See 501 for order N packed A. Order M SBPF A1 is shown at 503. This can be done by a series of fast transformations. One gets a smaller SBPF matrix A1 of order M. One finds the block cycle structure of T(A1) by applying the transformation T to B1 where B1 is the point form of SBPF A1. In matrix A1 each cycle move in A1 consists of moving an order NB sub matrix of A1 to another empty location of AP of size NB^2. A buffer of size NB^2 is required do all of these moves.

Since M<N, even when N is a multiple of NB, there is an area whose size is trapezoid T1, see 504, with base N−M and sides N and N−M+1 that needs to be saved in a buffer B, see 505. M is chosen so SBPF A1 fits into the packed space of order N packed A; ie, nt>mtb. See 506. Call step 0 the finding of M and N with this property. This T1 part of AP is saved in Buffer B and then one can deal with the eventual SBPF matrix A1. Call this transfer Step 1. Note that A1, which consists of M columns of A is still in AP in standard packed format after Step 1. Usually, T1 is the first N−M columns of packed A and packed A1 is the last M columns of packed A, see 503.

Recall that M<N. In step 2, we move forward packed order M A1 into a compact space of size mtb. Call this new compact matrix CM block packed format A1 consisting of m contiguous block CM swaths. The packed format order M A1 of 503 is moved to 506. Actually 506 reside in 501 as it has moved over the 504 area of 501 to make for the bulges in 503. This is okay, as 504 has been copied to 505. We now briefly describe how one gets from CM block packed format to SBPF A1. Call this step 3. In FIG. 5 this is the process of going from 506 to 507. Consider NB contiguous columns of CM A1(J:J+NB−1) where J=j*NB; call this matrix A3. See 508.

Think of A3 as a j by NB matrix whose elements are column vectors of length NB. A3 is a column swath of matrix A1. Again see 508. There are m swaths and they constitute all of A1. In 507, m=4. Now, apply the point transposition algorithm VIPX to this j by NB matrix A3 of vectors of length NB. The result is that now A3 has been replaced (over-written) as A3^T which is a size NB by j matrix of vectors of length NB. It turns out, as a little reflection will indicate, that A3^T consists of j order NB SB matrices concatenated together. See 507 which is the result of VIPX applied m−1=3 times to 506. One can do this operation in parallel for each of these j sub matrices A3 of A1. After completion of these m parallel steps one has transformed CM blocked packed A1 in-place to be A1 as a SBPF matrix A1 consisting of mt SB's.

The process of going from A3 in SB format to A3 in CM format is the "transpose" of the above procedure; i.e., given NB by j A3^T one transposes A3^T to (A3^T)^T in-place to get j by NB A3 in CM format (see 508 of FIG. 5). Call these two processes P CM to SB, algorithm VIPX, and P^−1 SB to CM, also using algorithm VIPX, as transpose applied twice is the identity transformation.

So, we can vector transpose each of the m CM swaths A3 in place by the method P we have already described. This result is order M SBPF A1. In FIG. 5, we stop here as our T in FIG. 5 is I.

Step 4 is the process of applying the transformation T to order M SBPF A1: we will get T(A1) as mt SB's. Step 5 is applying the inverse of process P=P^−1 to T(A1). Now, T(A1) is in CM format. We then, as Step 6 move expand CM T(A1) backwards in the array space of AP leaving spaces for matrix elements of packed A of array AP in buffer B. Finally, as Step 7 we use the buffer B and copy its contents out-of-place into the vacant places of the expanded packed T(A1) matrix. We have now described all the essential features of the algorithm.

The SMP parallel algorithm is obtained by letting different processors move the disjoint cycles associated with the transformation T of the small order matrix B1. If B1 only has a few large cycles then one cuts these cycles into several pieces. Each processor can move a disjoint piece of such a single long cycle. This covers step 4. Clearly, step 3 and 5 can be parallelized easily. Also, steps 2 and 6 are almost all M stride one dcopy operations and so, are easily parallelized.

In many cases, T will be the identity transformation I. FIG. 5 is describing this case. When T=I a user is interested in obtaining a SBPF representation of packed A. In this case, the eight step procedure above can be simplified. We describe two cases.

In case 1, SBPF A uses buffer B and AP(0:mtb−1) as storage. Steps 0 to 3 above are used. In FIG. 5 we are describing case 1. The final result is buffer 405 and SBPF A1 shown at 507.

In case 2, we describe a way to get a hybrid SBPF representation of packed A; we store the diagonal blocks of packed A in RFP format.

In case 2, we need not use steps 1 to 3. Instead, we use buffer B as a means of performing standard out-of-place algorithms. Therefore, we only cover modifications to steps 1 to 3. Consider a column swath of b consecutive columns from packed A of size S by b. The column swath is a trapezoid Ti of sides S and S−b+1 and base b. Let buffer B have size S*b. B can hold a square block of order b=r and n NB by b rectangles if S=n*NB+r. Here, S=N the order of packed A and the condition holds for the left-over swath of packed A. All remaining n swaths have size k*NB by NB where 1≦k≦n. We apply steps 2 and 3 for all n+1 swaths using buffer B as the target area of Step 2 and B itself for step 3. Step 1 is not used. There is an additional step which consists of out-of-place operations from buffer B back to the swath. Again, standard out-of-place algorithms can be used and, hence, need not be covered in this discussion.

Continuation-In-Part, First Exemplary Embodiment

Figure 6:
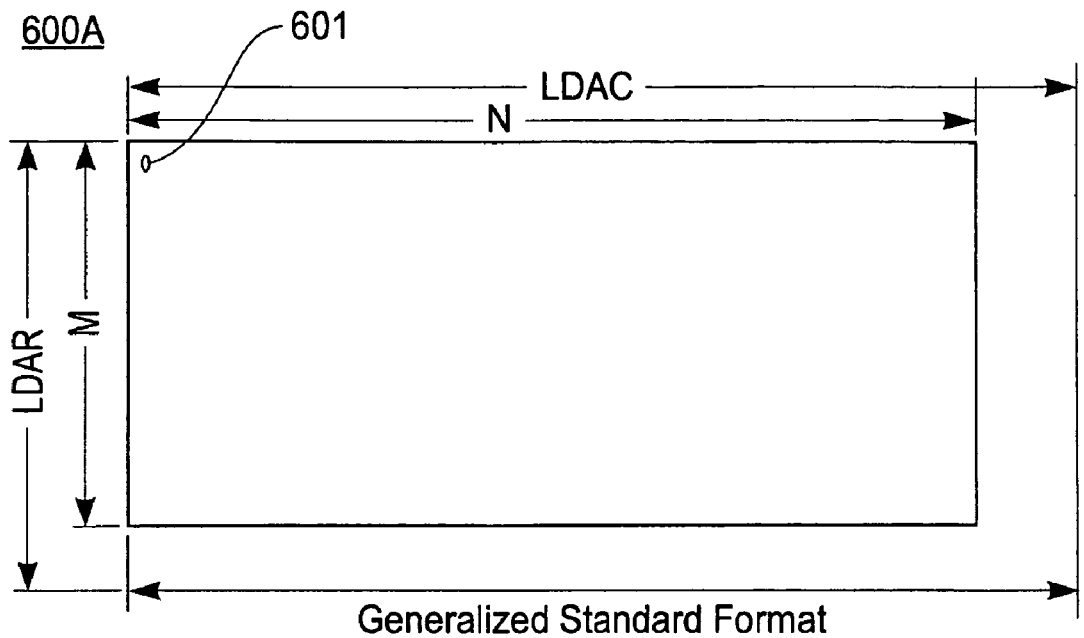
FIG. 6 illustrates the generalized standard format 600A and the rectangular block (RB) format 600B.
Figure 6:
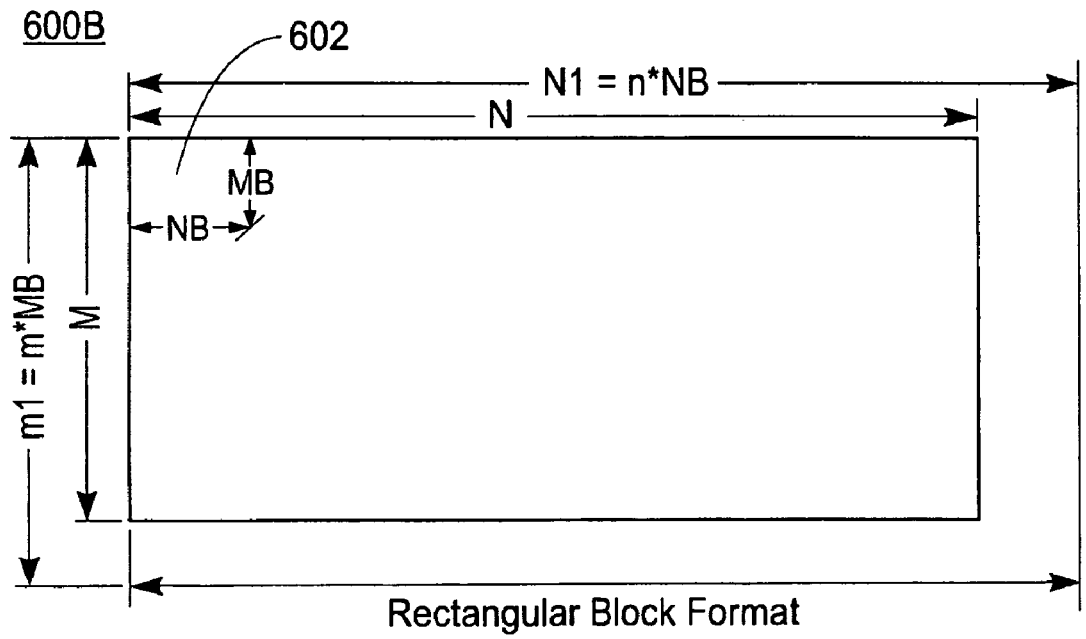

FIG. 6 shows the generalized standard full format 600A of matrices, and the rectangular block format 600B.

FIG. 7 shows an M=10 by N=5 size matrix A and an m=3 by n 2 sub matrix A(3:5,1:2).

FIG. 8 shows B, the transpose of matrix A and the corresponding n=2 by m=3 sub matrix B(1:2,3:5).

The exemplary first embodiment shows that NDS exactly generalizes use of standard Fortran and C 2-D arrays. This is a very broad generalization of standard full format for Fortran and C storage. Let A be size M by N and LDA>M, where LDA means leading dimension of matrix A. Both Fortran and C require storage for LDA*N elements for the array holding matrix A. Let LDAR=LDA. Now, we go further, and require storage for A of size LDAR*LDAC where LDAC>N. See layout 600A in FIG. 6, noting that R and C stand for "rows" and "column", respectively. We have treated the rows and columns of A in an equal manner by introducing LDAC. Note that standard full format does not have the concept of LDAC.

We call refer to this layout 600A in FIG. 6 as the "generalized standard full format." We now have A as having size M by N and LDAR>M and LDAC>N. Note that each a(i,j) is a one by one square sub-matrix of A; ie, a scalar element of A. Note the dot 601, . . . , denotes matrix element a(0,0) in the upper left hand corner of layout 600A.

As shown in FIG. 6, a further generalization of Fortran and C is to introduce blocking parameters MB>0 and NB>0 and to represent A as partitioned into contiguous sub matrices of size MB by NB, as shown in layout 600B. A would thus be embedded in an array A_B of size M1>ceil(M/MB)*MB by N1>ceil(N/NB)*NB. Storage for the array holding A_B is M1*N1, as shown in layout 600B. Note A_B(0,0) which is the (0,0) sub matrix 602 of A_B in the upper left hand corner of layout 600B. Now we can see the generalization. We let MB=NB=1, M1=LDAR and N1=LDAC. In this special case, layout 600B is identical to layout 600A.

Let B be any sub matrix of size m by n; ie, B=A(m1:m2, n1:n2) where m m2−m1+1 and n=n2−n1+1. A major advantage of standard format is that it allows a Fortran or C compiler to easily address individual elements of B. However, it becomes impossible to transpose B in place unless m=n=1. This fact is shown below. Our reason to do this is to demonstrate a major disadvantage of the Lao patent which our patent does not possess.

Now, with the NDSs of the present invention, it is just as easy to address individual elements of B. Furthermore, when m, m1 and m2 are multiples of MB and n, n1 and n2 are multiples of NB, B can be quickly "transposed" in place using this invention. In fact, other data movement of sub matrices can also be done quickly and in place as what we say here applies to RB's and SB's. By using the exemplary second embodiment described below, it also applies to ReB format. In summary, NDS allows for "fast data movement" via use of stride-one loading and storing.

Referring now to the drawings, and more particularly to FIGS. 7 and 8, we see that the top border, TB, and the left border, LB, contain location values that indicate where in the array for A and B the start of the jth column and the start of the ith row begins. These location values can be used to easily calculate where a(i,j) and b(i,j) reside in FIGS. 7 and 8. In FIG. 7, C=A(3:5,1:2) resides in locations 13 to 15 for column one and locations 23 to 25 for column 2. In general a(i,j), b(i,j) resides at LB(i)+TB(j) of FIGS. 7 and 8. Hence, D=B (1:2,3:5) resides in locations 16:17 for column one, 21:22 for column two and 26:27 for column three.

In FIG. 8, B =A^T, so that b(i,j) =a(j,i) for all i and j. Suppose we had a two dimensional labeling of A and B. Then clearly, C and D would occupy the same space in A and B. The proof is easy as one can reflect A in its main diagonal to obtain B. In doing so, it is clear that C reflects onto D which shows that sub matrices transpose onto themselves with a two dimensional layout.

Now consider the one dimensional layout of standard full format shown in FIGS. 7 and 8 as defined by LB(i)+TB(j). It is equally clear that locations of C do not map to the locations of D. For example a(3,1) at location 13 maps to b(1,3) at location 16. So this mapping would place a(3,1)=b(1,3) at loc(b(1,3))=16. Now, since the mapping is in-place the element a(6,1) at loc(a(6,1))=16 gets changed to a second copy of a(3,1) and a(6,1) gets destroyed. Similar remarks apply to the remaining five elements of C. The discussion just presented is the gist of a proof that Lao's invention does not hold for arbitrary sub matrices of a matrix A. Put another way, Lao's invention only works for the given M by N matrix A when it resides in the array A(0:M*N−1). The NDSs of the present invention, on the other hand, represent its sub matrices as residing in contiguous sub arrays and hence these sub matrices can be transposed in place by our invention.

As a practical application of this first embodiment, users can use it to input matrices for DLAFA that will lead to very high performance. The simple answer here is to use the NDSs of the present invention. Also, if matrix data is in standard format, this invention still gives a way to produce fast DLAFA processing.

Continuation-in-Part, Second Exemplary Embodiment

FIG. 9 shows an M=16 by K=18 size sub matrix A1, called A there. A is in standard column major (CM) format; LDA=M. FIG. 9 also shows D which contains the same elements of A1 but D is now in the register block (ReB) format of A1 with a vector length (VL) of 4.

FIG. 10 shows At after it has been transformed in place to D1 by calling VIPX (vector in-place transposition) with a vector length (VL) of 4 six times, once each for the k=6 swaths of A1.

FIG. 11 shows a K=18 by N=20 size sub matrix B1, called B there. B is in standard column major (CM) format; LDB=K. B is also depicted as n=4 column swaths.

FIG. 12 shows E=B(0: 17,0:4) which is the first of four column swaths of matrix B1 of FIG. 11. FIG. 12 also contains E^T. E^T is also the first of four register blocks (ReB's) of B1.

FIG. 13 shows E after it has been transformed in place by calling VIPX with a vector length (VL) of 3 to become E1.

FIG. 14 shows an M=16 by N=20 size sub matrix C1, called C there. C is in standard column major (CM) format; LDA=M. FIG. 14 also shows F which contains the same elements of A1 but F is now in the register block (ReB) format of C1 with a vector length (VL) of 4.

FIG. 15 shows C1 after it has been transformed in place to F1 by calling VIPX with a vector length (VL) of 4 four times, once each for the n=4 swaths of C.

This exemplary second embodiment combines cache blocking, described in the second above-referenced application, with Point In-place (IP) transformations on tiny matrices whose elements are contiguous vectors. These small matrices are assumed to be in standard CM or RM format. The IP transformations produce ReB format. There are two types of ReB's here. We are interested in producing fast DGEMM kernel routines. There are three sub matrices here A1, B1, and C1. We first concentrate on the sub matrix operands A1 and B1. Assume both A1 and B1 are in CM major order. The first type of ReB has to do with sub matrix A1 and the second type of ReB has to do with sub matrix B1.

We now consider a type one ReB. One starts with a single RB that is stored in CM order; see layout 900 in FIG. 9, where the RB is A1 with M=LDA=16 and K=18. This single RB is transformed in-place to ReB format; see layout 901 in FIG. 9. Previously, this operation was done out-of-place, as per the third co-pending application Ser. No. 10/671888, filed in 2003. Thus, in this exemplary embodiment of this continuation-in-part, a key idea is to use the fast vector in-place algorithm of this invention to accomplish this transformation described in this third co-pending application.

Let a sub-matrix of A, A1, be a M by K rectangular block, RB. We have M=m*MB and K=k*KB where MB and KB are tiny values denoting the sizes of a ReB; see FIG. 9 where M=16, K=18 and m=4, MB=4, k=6 and KB=3. Like FIGS. 7 and 8, FIGS. 9 to 15 have left borders LB and top borders TB which show where a(i,j) resides in the array that holds it; namely at LB(i)+TB(j). The values of FIGS. 9 to 15 are not necessarily realistic. However, they are general enough to show the underlying ideas.

Assume the RB is in CM format. We use this invention to transform A1 to ReB format via its use of our fast vector IP transpose algorithm (VIPX). We now give some brief details. View A1 as an m by K matrix A2 with each A2_{i,j} being a column vector of size MB. Apply the VIPX algorithm with calling sequence (m, N, MB, A2) of our invention to A2 to get matrix D which is m K vectors of size MB concatenated; layout 901. Note that one uses a vector length MB that is a SIMD vector length and so, on processors with SIMD vector loads, very fast SIMD loads can be used throughout.

If A1 is in RM format then in addition to possibly applying a fast VIPX algorithm one must also perform transposes of each of the row swaths of A1. This operation is really the same as a type two ReB algorithm which we now describe for the K by N sub matrix B1. The K of B1 is the same as the K of A1 as this equality is a requirement of matrix multiplication. Hence, K, k and KB are the same as for the type one case applied to matrix A1. Let N=n*NB and consider that B1 consists of n=4 swaths of size K by NB=5; see FIG. 11. The second type ReB transformation consists of transposing each of the n swaths; see FIG. 12 where the first column swath of B1 is denoted by E; 1200. This operation may be done in parallel as all n swaths of B1 are independent sub matrices of B1. See 1201, where EAT is given. An algorithm, called IPX, to do this is given in reference [GS]. Alternatively, since B1 is in CM format, then just apply the fast VIPX algorithm where the vector length is one.

Some remarks are in order. DGEMM requires one to update C by A*B, A*B^T, A^T*B or A^T*B^T. There are four cases here. We just consider the sub matrix operand A1 as the exact same remarks apply to the sub matrix operand B1. In DGEMM, sub matrix C1 is always M by N. A1 is either M by K or it is A1^T which means it is K by M. Finally, if A1 is in CM order then A1 is also A1^T but now in RM order.

We now examine the type one ReB algorithm again. Recall that we have K k*KB. Consider the following type one algorithm, Algorithm 2:

```
DO J = 0 , K – KB , KB
    CALL VIPX ( m, KB, MB, A(0,J) )
ENDDO
CALL VIPX ( m, k, MB*KB, A )
```

One can show this algorithm is identical to the type one algorithm described above. Algorithm 2 has two steps. The result after Step 1 is matrix D1 given in FIG. 10. D1 should be viewed as an m by k matrix whose elements are sub matrices of size mb by kb. Now the answer we want step 2 of Algorithm 2 to give is the type one algorithm result given at 901. It should be readily apparent that 901 can be obtained from matrix D1 by just transposing the m by k block matrix D1 but not transposing any of the mb by kb sub matrices. An algorithm to do this is VIPX where the vector length is mb*kb; see step 2 above.

It should now be readily apparent that there are many ways to go from a type one RB to ReB and vice versa. This flexibility allows for a choice of transformations with the idea that one or more of them might be fastest.

We now examine the type two ReB algorithm again. Recall that we have K k*KB. Consider the following type two algorithm, Algorithm 3:

```
DO J = 0 , N – NB , NB
    CALL VIPX ( k, NB, KB, A(0,J) )
    DO I = 0, K – KB, KB
        CALL VIPX ( KB, NB, 1, A(I,J) )
    ENDDO
ENDDO
```

One can show this algorithm is identical to the type two algorithm described above. The outer J do loop above is over n swaths and consists of two steps. For J=0 these two steps are depicted in FIG. 13. For step one recall that VIPX converts a swath of NB columns in CM format, 1200, to k ReB's of size KB by NB; see 1300. Step 2 must transform the result of step 1 to be the transpose of the K by NB first swath of matrix B1, 1201. Thus, it is readily apparent that one now needs to transpose each of these k KB by NB ReB's; see 1301.

It should now be readily apparent that there are many ways to go from a type two RB to its ReB format and vice versa. This flexibility allows for a choice of transformations with the idea that one or more of them might be fastest.

Now we turn to the C1 matrix of DGEMM. Assume C1 is a RB in standard CM full format; see 1400. Obtaining C1 in ReB format is identical to what we did for matrix A1. Again, the key idea is to use the fast vector in-place algorithm of this invention to accomplish this transformation. Let a sub-matrix of C, C1, be an M by N RB. We have M=m*MB and N=n*NB where MB and NB are tiny values denoting the sizes of a ReB. The values for M, m, MB and N, n, NB are already fixed due to the conformability constraints of matrix multiplication. See FIG. 14 where M=16, N=20 and m=4, MB=4, n=4 and NB=5. View C1, 1400, as a m by N matrix C2 with each C2_{i,j} being a column vector of size MB. Apply the VIPX algorithm of our invention to C2 to get matrix F which is m N vectors concatenated; see 1401. Note that one uses a vector length MB that is a SIMD vector length and so very fast SIMD loads can be used throughout. Now, for matrix C and hence also C1 there is no transpose case in the DGEMM standard. Hence the row major case does not apply here as it did for matrix A, and its generic sub matrix A1. Like the A1 case, there are many ways to find the ReB format of C1 as we can apply Algorithm 2 above. Algorithm 2 has two steps. The result after Step 1 is given in FIG. 15 as matrix F1. Matrix F1 is an m1 by n1 block matrix whose elements are sub matrices of size mb by nb. Now the answer we want for step 2 of Algorithm 2 to produce is matrix F, 1401. It should be readily apparent that F at 1401 can be obtained from matrix F1 by just transposing this m1 by n1 block matrix F1 but not transposing any of the mb by nb sub matrices. An algorithm to do this is VIPX where the vector length is mb*nb; see step 2 of Algorithm 2 above.

This exemplary second embodiment demonstrates that the concept of this aspect of the continuation-in-part will, therefore, additionally cover ReB format that was first presented in Applicants' previous U.S. patent application Ser. No. 10/671,888 "Method and structure for producing high performance linear algebra routines using register block data format routines", filed on Sep. 29, 2003. This application is incorporated herein by reference as teaching the method to form the NDS format of register blocking (ReB).

Continuation-in-Part, Third Exemplary Embodiment

As shown above in the first exemplary embodiment, standard format works on scalars or one-by-one sub matrices of A. Here MB=NB=1. On the other hand, NDS works on rectangular sub matrices of size MB by NB. It is very important to note that these sub matrices are contiguous blocks of memory. Another fact is that DLAFA for both data representations have exactly the same form. Now a DLAFA consists almost entirely of applying matrix multiply MM algorithms.

Also, matrix transposition algorithms are an integral part of MM algorithms. Finally, matrix multiply algorithms require one to block for the memory hierarchy.

Now today, the best way to move data in any memory system is stride-one which is the same as moving contiguous pieces of memory (e.g., blocks). Standard format represents blocks as non-contiguous pieces of memory, whereas NDS blocks are contiguous pieces of memory.

This third exemplary embodiment adds a feature to the parent application (e.g., the first identified co-pending application) by pointing out that a DLAFA can be viewed as being a series of MM algorithms. Given that this is true, we can then observe that MM requires:

(1) cache blocking (data movement) and that NDS (e.g., any of the bases of NDS described in the first identified co-pending application), gives the fastest form of data movement; and (2) matrix transposition is an integral part of MM.

Continuation-in-Part, First and Third Embodiments Combined

The first exemplary embodiment described above generalized matrix data structures, and the third exemplary embodiment generalizes matrix algorithms. A general computer science principle is "algorithms are related to data structures." In this exemplary embodiment, the combination of the first and third embodiments leads to "optimal data management for DLAFA." The main components of this paradigm is:

Cache blocking is the key factor;

NDS/DLA algorithms use the paradigm of cache blocking via the basic matrix multiply algorithm DGEMM;

Aligned contiguous memory via SB's, RB's, ReB's or vectors gives fastest memory movement is a fundamental premise; and The inventors' previous papers and patent applications show this is possible for DLA algorithms using NDS.

Enhancement by Method of U.S. patent application Ser. No. 11/328,344

Finally, it is noted that the method of the present invention can be enhanced by using the technique of co-pending application, U.S. patent application Ser. No. 11/328,344 to Chatterjee et al., entitled "Method and Structure for an Improved Data Reformatting Procedure." This co-pending application is hereby incorporated herein by reference.

In this co-pending application is described a method wherein writing to memory can be made more efficient if some of the safeguards of compilers are bypassed. That is, a compiler is designed to make "safe" decisions and, therefore, lacks awareness of the overall application's environment. Specific to the present application, for LOAD and STORE instructions, a compiler will initially retrieve data at the target location in memory prior to writing data to that target location. In the co-pending application, it is noted that such compiler safeguards can result in inefficiencies in the operations of writing data to memory. To overcome these inefficiencies, this co-pending application provides a mechanism that permits a high-level signal to override the safeguards typically built into compilers, using such mechanisms as existing DCBZ (Data Cache Block Zero) and DCLZ (Data Cache Line Zero) commands.

Therefore, since the present invention involves extensive copying of data in the memory of a computer, it is noted that the techniques of this co-pending application can be utilized to further increase the efficiencies, including an improvement of approximately 50% in the copying processing, since the normal compiler safeguards would not be needed to execute the methods of the in-place transformations described in the present application.

Exemplary Flow Chart for Continuation-in-Part Embodiments

Figure 16:
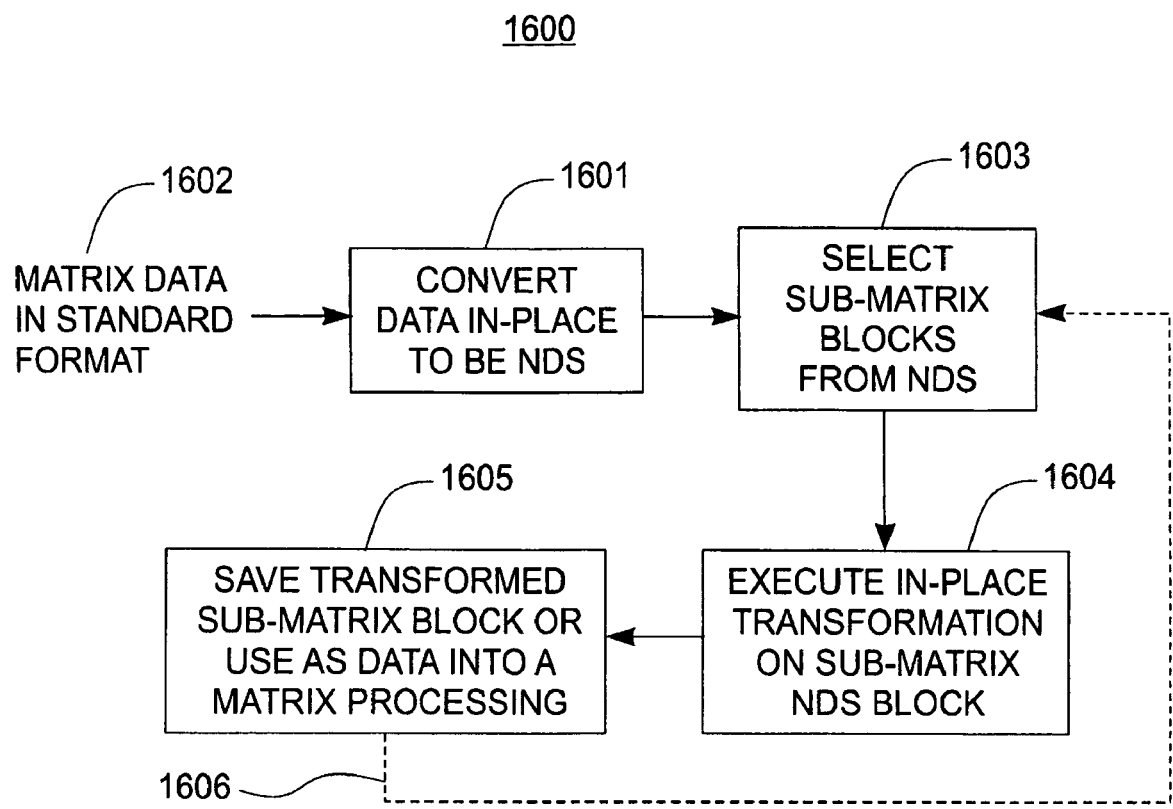
FIG. 16 provides an exemplary flowchart 1600 that summarizes the additional aspects of the continuation-in-part embodiments.

FIG. 16 illustrates a flowchart 1600 that demonstrates in summary format these aspects of the continuation-in-part embodiments. In step 1601, matrix data in standard format is provided as input data 1602 into an in-place conversion to any of the NDSs described here and elsewhere. As mentioned, these NDSs are any of various formats in which matrix data has been converted from standard column major/row major format into another format so that the data can be retrieved as contiguous data in memory in the order that the data is predetermined to be needed for processing.

Various NDSs described include, for example, cache blocks of data based upon the machine cache working space for processing which are square or rectangular blocks of matrix data, SBPF or rectangular-shaped data structures of triangular/symmetrical matrix data, or the register block format used to overcome the L0/L1 cache interface.

This continuation-in-part application is partly concerned with defining these NDSs for purposes of showing the generality of the in-place transformation procedure which only applies for the NDSs and not the standard formats. Now, presuming one of the NDSs, the method of this continuation-in-part, in step 1603 selects from the NDS data one or more submatrix block(s). In step 1604, each submatrix block is then processed by an in-place transformation to provide an NDS transformed submatrix data block. In step 1605, this transformed data can then be either stored in memory for future processing or can be used directly to provide data for an immediate matrix processing. We emphasize again that what we just said above is not possible when the original matrix data is in standard format.

A major use of the present invention, as defined in the parent application, is to be able to transform standard formats in-place to NDS. Previously this could not be done. In this method of the parent application, one can take existing software and modify it to be able to run on the newer computers. This is called migration.

This continuation-in-part provides exemplary embodiments that further improve over the parent application, by being able to divide the NDSs into blocks that alternatively can be transformed (e.g., transposed) in-place and "on-the-fly", as the data is retrieved from memory for processing. This additional capability is desirable, since it allows the NDSs to be useful for existing and future software modules for matrix multiplication processing and hence DLAFA.

Exemplary Hardware Implementation

FIG. 17 illustrates a typical hardware configuration of an information handling/computer system in accordance with the invention and which preferably has at least one processor or central processing unit (CPU) 1711 with one or more associated caches such as an L1 or L2 cache with a CPU and a possible associated L0 register file of a FPU or just a normal FPU.

The CPUs 1711 are interconnected via a system bus 1712 to a random access memory (RAM) 1714, read-only memory (ROM) 1716, input/output (I/O) adapter 1718 (for connecting peripheral devices such as disk units 1721 and tape drives 1740 to the bus 1712), user interface adapter 1722 (for connecting a keyboard 1724, mouse 1726, speaker 1728, microphone 1732, and/or other user interface device to the bus 1712), a communication adapter 1734 for connecting an information handling system to a data processing network, the Internet, an Intranet, a personal area network (PAN), etc., and a display adapter 1736 for connecting the bus 1712 to a display device 1738 and/or printer 1739 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1711 and hardware above, to perform the method of the invention.

This signal-bearing media may include, for example, a RAM contained within the CPU 1711, as represented by the fast-access storage for example. Alternatively, the instructions may be contained in another signal-bearing media, such as a magnetic data storage diskette 1800 (FIG. 18), directly or indirectly accessible by the CPU 1711.

Whether contained in the diskette 1800, the computer/CPU 1711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

In yet another aspect of the present invention, it should be apparent that the method described herein has potential application in widely varying areas for analysis of data, including such as areas as business, manufacturing, government, etc. Therefore, the method of the present invention, particularly as implemented as a computer-based tool, can potentially serve as a basis for a business oriented toward analysis of such data, including consultation services. Such areas of application are considered as covered by the present invention.

While the invention has been described in terms of a single exemplary embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A computerized method for an in-place transformation of matrix data, said method comprising:
for a matrix A data stored in a New Data Structure (NDS) format and a transformation T having a compact representation, forming, using a processor on a computer, one or more sub matrix blocks A1 of size MB by NB of said NDS format data, MB and NB comprising blocking parameters defining block sizes such that MB * NB lies between a size of an L1 cache and an L2 cache on said computer, said NDS representing data of said matrix A in a format other than a row major format or a column major format, such that said data for said matrix A is stored as a matrix of contiguous sub matrices A1 in an order predetermined to provide said data for a matrix processing; and
applying said transformation T to each said MB by NB block A1, using an in-place transformation processing, said in-place transformation processing thereby replacing data of said blocks A1 with contents of T(A1).

2. The method of claim 1, wherein said NDS comprises sub matrices in a rectangular block (RB) format.

3. The method of claim 2, wherein said RB format comprises a square block (SB) format.

4. The method of claim 1, wherein said NDS comprises sub matrices in Square Block Packed (SBP) format.

5. The method of claim 1, wherein said NDS comprises sub matrices in Register Block (ReB) format.

6. The method of claim 1, wherein said NDS comprises sub matrices that fit into a given cache.

7. The method of claim 1, wherein said data transformation comprises a matrix transposition of one or more given sub matrices.

8. The method of claim 1, further comprising:
providing said transformed sub matrix block of data to be data for a matrix processing module.

9. The method of claim 8, wherein said matrix processing module comprises a Dense Linear Algebra Factorization Algorithm (DLAFA) processing.

10. The method of claim 1, wherein said matrix data is initially stored in said memory in a standard format comprising one of column major format and row major format, said method further comprising:
preliminarily converting in-place said matrix data from said standard format into said NDS format.

11. The method of claim 1, further comprising:
selectively providing a signal to permit data to be written to a target location in memory without first retrieving data from said target location.

12. The method of claim 1, as implemented by an entity providing consultation services.

13. A tangible signal bearing storage medium tangibly embodying a program of machine-readable instructions executable by a digital processing apparatus to perform a computerized method for an in-place transformation of matrix data according to claim 1.

14. The signal bearing storage medium of claim 13, as comprising one of:
a hard drive memory on a computer;
a RAM memory on a computer;
a storage device associated with a server; and
a standalone diskette of instructions to be inserted into a computer unit for loading said instruction onto said computer.

15. The signal bearing storage medium of claim 13, wherein said NDS comprises at least one of:
a rectangular block (RB) format;
a Square Block format;
a Square Block Packed (SBP) format;
a Register Block (ReB) format; and
a sub matrix fitting into a cache.

16. An apparatus, comprising:
a memory to store matrix data; and
a processor,
wherein:
data for a matrix A is stored in said memory in a New Data Structure (NDS) format, said NDS representing data of said matrix A in a format other than a row major format or a column major format; and
said processor:
forms one or more sub matrix blocks A1 of size MB by NB of said NDS format data such that said data for said matrix A is stored as a matrix of contiguous sub matrices A1 in an order predetermined to provide said data for a matrix processing, wherein MB and NB comprise blocking parameters defining block sizes such that MB * NB lies between a size of an L1 cache and an L2 cache on said apparatus; and
applies said transformation T to said MB by NB block A1, using an in-place transformation processing, said in-place transformation thereby replacing data of said block A1 with contents of T(A1).

17. The apparatus of claim 16, wherein said data transformation comprises a matrix transposition.

18. The apparatus of claim 16, wherein said matrix data is initially stored in said memory in a standard format comprising one of column major format and row major format, said processor further converting in-place said matrix data from said standard format into said NDS format.

19. The apparatus of claim 16, wherein a signal is selectively provided to permit a data write to a target location in memory without first retrieving data from said target location.

* * * * *